US007063799B2

(12) United States Patent
Hayakawa et al.

(10) Patent No.: US 7,063,799 B2
(45) Date of Patent: Jun. 20, 2006

(54) INK JET RECORDING HEAD, MANUFACTURING METHOD THEREFOR, AND SUBSTRATE FOR INK JET RECORDING HEAD MANUFACTURE

(75) Inventors: Kazuhiro Hayakawa, Isehara (JP); Makoto Terui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 10/745,608

(22) Filed: Dec. 29, 2003

(65) Prior Publication Data

US 2004/0174407 A1 Sep. 9, 2004

(30) Foreign Application Priority Data

Dec. 27, 2002 (JP) ............................ 2002-379594
Dec. 27, 2002 (JP) ............................ 2002-379638

(51) Int. Cl.
*C03C 15/00* (2006.01)

(52) U.S. Cl. ............................ 216/83; 216/27; 347/63; 438/21

(58) Field of Classification Search .................. 216/83, 216/27; 347/63; 438/21
See application file for complete search history.

(56) References Cited

U.S. PATENT DOCUMENTS

| | | | |
|---|---|---|---|
| 5,218,376 A | 6/1993 | Asai | |
| 5,387,314 A | 2/1995 | Baughman et al. | |
| 5,478,606 A | 12/1995 | Ohkuma et al. | |
| 5,729,261 A | 3/1998 | Burke et al. | |
| 6,126,271 A | 10/2000 | Terui | |
| 6,467,884 B1 | 10/2002 | Murooka et al. | |
| 6,698,868 B1 * | 3/2004 | Trueba et al. | 347/63 |
| 2002/0097299 A1 | 7/2002 | Terui | |
| 2002/0129495 A1 * | 9/2002 | Trueba et al. | 29/890.01 |
| 2003/0082841 A1 * | 5/2003 | Haluzak et al. | 438/21 |

FOREIGN PATENT DOCUMENTS

| | | |
|---|---|---|
| EP | 0 841 167 | 5/1998 |
| JP | 4-10940 | 1/1992 |
| JP | 6-238904 | 8/1994 |
| JP | 10-34928 | 2/1998 |
| JP | 10-95119 | 4/1998 |
| JP | 3143307 | 12/2000 |
| WO | WO 02/098665 | 12/2002 |

OTHER PUBLICATIONS

S. Wolf and R.N. Ttauber, Silicon Processing for the VLSI Era, vol. 1- Process Technology, Lattice Press, 1986.*

* cited by examiner

*Primary Examiner*—Nadine Norton
(74) *Attorney, Agent, or Firm*—Fitzpatrick, Cella, Harper & Scinto

(57) ABSTRACT

A base member for use in manufacturing an ink jet recording head, which includes a supply port, an ejection outlet, a liquid flow path for directing liquid supplied from the supply port to the ejection outlet, and an ejection pressure generating element, disposed in the liquid flow path, for ejecting the liquid. The supply port is formed as a through-opening in a substrate on which the ejection pressure generation element is provided. The base member includes a recessed portion formed on the side of the substrate provided with the ejection pressure generation. The recessed portion extends from an edge of the supply port to a neighborhood of the ejection pressure generation element. A protection layer is provided at least on a portion of the substrate surface constituting the recessed portion.

14 Claims, 23 Drawing Sheets

INK JET RECORDING HEAD, MANUFACTURING METHOD THEREFOR, AND SUBSTRATE FOR INK JET RECORDING HEAD MANUFACTURE

BACKGROUND OF THE INVENTION

Field of the Invention

The present invention relates to an ink jet recording head, a manufacturing method therefor, and a substrate for ink jet recording head manufacture.

Generally, an ink jet recording head used for an ink jet recording method (liquid ejection recording method) comprises: a plurality of minute holes (which hereinafter will be referred to as orifices) from which liquid (ink) is ejected; a plurality of liquid passages leading to the plurality of orifices; and a plurality of ejection pressure generating portions disposed in the liquid passages to generate the pressure for ink ejection. In order to produce high quality images with the use of this type of ink jet recording head, it is desired that the plurality of orifices are uniform, and remain consistent, in the volume of ink which is ejected from an orifice, and the speed at which ink is ejected from an orifice. One of the recording methods capable of achieving this objective is disclosed in Japanese Laid-open Patent Application 4-10940. According to this recording method, an electro-thermal transducer is employed as the ejection pressure generation element to be disposed in the ejection pressure generating portion. The ink ejection mechanism of this recording method is as follows. Thermal energy large enough to instantly raise the ink temperature to a level higher than the so-called film-boiling point is generated by applying voltage to the electro-thermal transducer in response to a driving signal which reflects recording information. As a result, bubbles are generated in the ink, and the ink is ejected in the form of an ink droplet from the orifice by the pressure generated by the bubbles.

In the case of this recording method, the volume of ink which is ejected in the form of an ink droplet is mostly determined by the size of the area of the orifice, and the distance between the ejection pressure generation element and orifice (which hereinafter will be referred to as "OH distance"). Thus, in the case of an ink jet recording head for this type of recording method, it is desired to reduce the OH distance as much as possible in order to reduce the ink droplet size as much as possible so that an image can be recorded at as high a level of resolution as possible. Further, in order to assure that ink is ejected in the form of an ink droplet the volume of which matches a predetermined specification, an ink jet recording head must be accurately formed to make the OH distance match the predetermined specification.

One of the ink jet recording head manufacturing methods capable of making the OH distance match the predetermined specification is disclosed in Japanese Patent 3143307. According to this method, a pattern for liquid passages is formed of dissolvable resin on a substrate on which ejection pressure generation elements have been formed. Then, in order to form a layer which will become walls which separate the liquid passages, a solution created by dissolving, in solvent, an epoxy resin which remains in the solid state at room temperature, is coated on the dissolvable resin layer on the substrate. Then, ejection orifices are created through this layer. Lastly, the dissolvable resin layer is dissolved away.

FIG. 29 is a schematic drawing of one of the ink jet recording heads produced following the above described steps; FIG. 29A is a perspective view of the ink jet recording head, the orifice plate 606 of which formed of the above described wall formation layer has been removed, and FIG. 29B is an enlarged sectional view of the ink jet recording head, taken at a line A—A in FIG. 29A.

This ink jet recording head has a substrate 601 on the obverse surface of which a plurality of ejection pressure generation elements 602 are present. The substrate 601 has a through hole formed, as an ink supply hole 610, through the substrate 601, by etching the substrate 601 from the reverse side, with the reverse surface masking layer 609 used as a mask. The plurality of ejection pressure generation elements 602 are arranged in two rows, at a predetermined pitch, along the lengthwise edges of the opening of the ink supply hole 610, on the obverse side of the substrate 601, one for each edge. This ink jet recording head is of the so-called side shooter type. Therefore, the orifices 607 of the orifice plate 606 formed on the substrate 601 are disposed directly opposite the top surface of the ejection pressure generation elements 602, one for one.

Further, not only are the ink jet recording apparatuses such as the above described one required to have higher resolution and higher quality, but also higher throughput, in other words, higher ejection frequency (driving frequency). In order to raise ejection frequency, it is necessary to increase the refill speed, that is, the speed at which ink passages are refilled with ink after ink ejection. In order to increase refill speed, it is desired to reduce the flow resistance of the ink passage from the ink supply hole to the orifice.

In the past, therefore, in order to increase ink refill speed, measures have been taken to place an ink supply hole, from which ink flows into each ink passage, as close as possible to an ejection pressure generation element. More specifically, measures have been taken to reduce the ink passage in length as well as height. However, there was a limit to the level of accuracy at which an ink supply hole could be formed. Also, in order to assure that a plurality of ink passages properly and harmoniously work, it was necessary to prevent the so-called cross-talk, that is, the phenomenon that ink ejection becomes unstable due to the propagation of the pressure generated, when ejecting ink, among the plurality of nozzles. In other words, the measure of reducing the length of an ink passage had a limit of its own. Therefore, the employment of this measure was not an ultimate solution to the problem.

There is disclosed in Japanese Laid-open Patent Application 6-238904, another method for raising the level of accuracy at which an ink supply hole is formed. According to this method, a groove is highly precisely formed in the obverse surface of a substrate, from the obverse side of the substrate, so that the groove aligns with the opening of an ink supply hole, on the obverse side on the substrate, which will be formed in one of the subsequent steps, and then, another groove is formed through the substrate from the reverse side, to be merged with the groove on the obverse side to complete a through hole, or the ink supply hole. In other words, a groove is formed from the obverse side of the substrate, that is, the side on which ejection pressure generation elements are to be formed, and the edge of this groove becomes the edge of the ink supply hole, on the obverse side of the substrate. Therefore, the edge of the ink supply hole, on the obverse side of the substrate, is accurately positioned relative to the ejection pressure generation elements, making it possible to reduce the ink passages in length. Further, since the level of accuracy at which an ink supply hole is formed is increased, the plurality of ink passages can be made uniform in length. With the nozzles being uniform in impedance, they are virtually uniform in the upper limit of ejection frequency, making it possible to raise the effective ejection frequency of an ink jet recording head.

There is disclosed in Japanese Laid-open Patent Applications 10-34928 and 10-95119 another method for raising the ejection frequency of an ink jet recording head in spite of reduction in the OH distance. According to this method, in order to satisfy the inequality of $OH \leqq LH$, a substrate is shaved across the obverse surface, except for the areas across which ejection pressure generation elements have been formed to be positioned in ink passages, one for one. Therefore, the reduction in the OH is compensated for by the substantial increase in cross section, enough to reduce the flow resistance of the ink passages; in other words, it is possible to raise the ejection frequency of an ink jet recording head to enable the ink jet recording head to record at a higher speed. Incidentally, also in the case of this method, the OH distance can be made accurate to a predetermined specification by accurately forming the nozzle formation member which is to be formed of resin or the like on a substrate.

SUMMARY OF THE INVENTION

Japanese Laid-open Patent Application 6-238904, however, does not disclose a method for protecting the surface of the ink supply hole, that is, the surface of the groove, although it discloses the above described method for forming the through hole, as the ink supply hole, through the substrate by merging the groove formed from the obverse side of the substrate, with the groove formed from the reverse side. Thus, if an ordinary silicon wafer is used as the substrate for an ink jet recording head, an ordinary method for forming an ink supply hole is not satisfactory to make the lateral surfaces of the ink supply hole, that is, silicon surfaces, resistant to corrosive ink such as alkaline ink.

Besides, even if an anisotropic etching method is used to form the two grooves from the obverse and reverse sides, one for one, in order to make the surfaces of the two grooves highly resistant to the corrosiveness of alkaline ink, more specifically, to form the two grooves so that their surfaces will have a crystal orientation index of <111>, the ridge created as the groove formed from the obverse side of the substrate merges with the groove formed from the reverse side does not become resistant to the corrosiveness of alkaline ink, even though the surfaces of the two grooves have the crystal orientation index of <111>. Moreover, the rate at which this ridge, resulting from the merging of the two surfaces with the crystal orientation index of <111>, is etched by an anisotropic etching method is higher than the rate at which the two surfaces with the crystal orientation index of <111> are etched by an anisotropic etching. Therefore, it is very difficult to form this ridge to match a predetermined pattern. This problem is not limited to an anisotropic etching method. That is, even if a wet etching method is employed, the ridge resulting from the angular merging of the two surfaces is likely to be etched at a higher rate than the other portion of the substrate, making it very difficult to give the ridge the predetermined configuration.

Further, although Japanese Laid-open Patent Applications 10-34928 and 10-95119 disclose the ink supply hole forming method in which the substrate is shaved, on the obverse side, across the areas where ejection pressure generation elements have been formed, in order to make lower the areas other than where the ejection pressure generation elements have been formed, and then, a through hole is formed from the reverse side of the substrate so that the through hole reaches the shaved portion of the substrate, these documents do not show any method for protecting the surfaces of the shaved portions of the substrate. Moreover, Japanese Laid-open Patent Application 10-34928 discloses the ink supply hole forming method in which a through hole is formed as an ink supply hole through a substrate from the reverse side of a substrate, and then the portions of the obverse side of the substrate which surround the opening of the through hole, on the obverse side, are etched from the obverse side. But this document does not disclose any method for protecting the surfaces of the etched portions. In other words, the methods disclosed in these laid-open patent applications cannot necessarily provide surfaces exposed by etching which have resistance to highly corrosive liquid such as alkaline ink. Therefore, when the methods disclosed in these patent applications are employed, the ridge resulting from the merging of the surface of an ink supply hole formed by etching from the reverse side of a substrate with the surface of the portions of the substrate exposed by etching from the obverse side, that is, the edge of the opening of the ink supply hole on the obverse side, is etched at a higher rate, making it difficult to form the edge of the opening of the ink supply hole on the obverse side match a predetermined specification, with the use of a wet etching method. For example, when a substrate is etched across the areas which will become ink passages, one for one, the portions of the substrate where the ink passages intersect with the ink supply hole become rounded. This problem reduces latitude in ink jet recording head design.

Further, in the case of the methods in which, after a recess is formed in the obverse surface of a substrate, the member for forming nozzles, the ejection pressure generation elements, a semiconductor circuit, such as the circuit for driving the ejection pressure generation elements, etc., are formed, and then an ink supply hole is formed from the reverse side of the substrate, it is necessary to prevent the nozzle formation member, semiconductor circuit, etc., from being damaged in the step in which the ink supply hole is formed. This makes impractical the usage of most of the anisotropic etching methods, which are capable of highly precisely processing the substrate for an ink jet recording head, but use highly alkaline chemicals, for example, KOH (potassium hydroxide) and TMAH (tetramethyl ammonium hydroxide). On the other hand, if sand blasting, laser etching, or the like, is used to form an ink supply hole, debris is generated, which raises the concern that the debris might plug the nozzles of the ink jet recording head, in particular, when forming an ink jet recording head having the extremely minute nozzles required in recent years.

Thus, the primary object of the present invention is to provide an ink jet recording head in which the height of each of the ink passages is higher in the adjacencies of the ink supply hole than in the adjacencies of the ejection pressure generation element, the edge of the ink supply hole, on the obverse side of the substrate, from which each ink passage extends, has a configuration matching a predetermined specification, and even the subordinate recess immediately next to the edge of the ink supply hole, on the obverse side of the substrate, is highly resistant to the corrosiveness of ink; an ink jet recording head manufacturing method for forming such ink jet recording head; and a substrate for such ink jet recording head.

According to the primary aspect of the present invention for accomplishing the above described object, an ink jet recording head substrate for use in manufacturing an ink jet recording head which comprises an ink supply hole through which liquid is externally supplied, orifices through which liquid is ejected, a plurality of liquid passages extending from the ink supply hole to the orifices, one for one, to guide the liquid from the ink supply hole to the orifices, and a plurality of ejection pressure generating portions disposed in the liquid passages, at a predetermined location, to generate the pressure for ejection liquid; and in which the ink supply hole was formed, as a through hole, in the substrate on which ejection pressure generation elements, as the ejection pressure generating portions, are present, is characterized in that the obverse surface of the substrate, that is, the surface of the substrate on which the ejection pressure generation elements have been formed, is provided with a recess which occupies the area from the edges of the ink supply hole, on the obverse side of the substrate, to the adjacencies of the ejection pressure generation elements, and also in that the substrate is covered with a protective layer, across a minimum area of the surface of the recess.

According to another aspect of the present invention, the recess is structured so that its bottom surface is parallel to the surface of the substrate across which the ejection pressure generation elements are present. In this case, the recess is formed so that there is a step between the bottom surface of the recess and the surface of the areas of the substrate across which the ejection pressure generation elements are present. It is thought that, in the case of this structure, the unwanted bubbles formed by the air or the like which enters the head during head usage can be trapped by the stepped portions resulting from the formation of the recess. As these bubbles are trapped by these stepped portions, which are located away from the ejection energy generation elements, they are prevented from adversely affecting ink ejection.

Further, the recess may be formed in the area of the surface of the substrate on which ejection pressure generation elements are present, so that a plurality of portions of the recess extend from the edges of the ink supply hole toward the area on which the ejection pressure generation elements are present. In this case, the liquid passage walls, which separate a given liquid passage from the adjacent liquid passages, may be extended on the area of the surface of the substrate on which the ejection pressure generation elements are present, more specifically, in the intervals between adjacent ejection pressure generation elements, and the intervals between adjacent subordinate recesses extended toward the ejection pressure generation elements, one for one, from the primary recess (FIG. 6A). With the employment of this structural arrangement, that is, by extending the subordinate recesses to the adjacencies of the ejection pressure generation elements, not only can the ink passages be substantially reduced in flow resistance, but also, they can be increased in length enough to effectively prevent the problem that ink ejection becomes unstable due to the propagation of the pressure generated for ink ejection, across nozzles.

The protective layer may be formed so that the ejection pressure generation elements and the driving circuit therefor are covered, at least partially, in order to enable the protective layer to prevent these components from being corroded by ink.

Further, the protective layer may be shared by one or more of the functional layers of the driving circuit for the ejection pressure generation elements. With such an arrangement, the protective layer can be more efficiently formed.

As the material for the protective layer, it is possible to think of various substances resistant to the wet etching employed for forming the ink supply hole, for example, silicon nitride, silicon oxide, silicon oxide-nitride, metallic substances such as Ta, Cu, Au, Pt, etc., alloys thereof, organic substances such as polyamide, polyether-amide, etc.

According to another aspect of the present invention, a manufacturing method for manufacturing an ink jet recording head in accordance with the present invention is characterized in that it comprises: a step for forming a recess in the surface of a substrate on the side on which ejection pressure generation elements are present, by etching the substrate, from the line which corresponds in position to the theoretical edges of an ink supply hole which will be formed later, to the lines parallel and close to the rows of ejection pressure generation elements; a step for forming a protective layer resistant to the wet etching used for forming the ink supply hole, across the surface of the substrate on the side on which the ejection pressure generation elements are present, in order to cover a minimum area of the surface of the recess; and a step for forming the ink supply hole by wet etching so that the ink supply hole merges with the recess, the surface of which is covered with the protective layer.

In the case of the above described ink jet recording head manufacturing method, as a groove is formed by wet etching through the substrate from the reverse side in order to form an ink supply hole, ridges are formed by the surfaces of the groove and the bottom surface of the recess. Since the bottom surface of the recess is covered with the protective layer, it does not occur that the etching speed increases at these ridges; in other words, the etching speed remains constant even at the ridges. Therefore, the ridges do not deviate in configuration. In other words, this ink jet recording head manufacturing method can precisely form these ridges to virtually match a desired specification.

Also in the case of the above described ink jet recording head manufacturing method, the bottom surface of the recessed portion of each ink passage from the ink supply hole to the ink nozzle, which results from the formation of the recess, is covered with the protective film. Therefore, the ridge formed by the bottom surface of the recessed portion of each ink passage, and the surface of the ink supply hole, is highly resistant to the corrosiveness of ink. Further, if the functional layers for the driving circuit for the ejection pressure generation elements are exposed at the lateral surfaces of the recessed portion of the ink passage, this protective layer may be given the function of protecting the exposed portions of the functional layers from being corroded by ink.

Also in the case of the ink jet recording head manufacturing method in accordance with the present invention, a dry etching method such as chemical dry etching, reactive ion etching, etc., a wet etching method such as anisotropic etching, a physical etching method such as laser processing, or a mechanical etching method such as drilling, end milling, etc., can be used to form the recess. In any case, the protective layer is formed on the surface of the recess. Therefore, the surface of the recessed portion of each ink passage, resulting from the provision of the recess, is highly resistant to the corrosiveness of ink. Further, it is thought that the debris generated when the recess is formed, in particular, when a mechanical process is used to form the recess, can be confined by, or in, the protective layer to prevent the problem that, while a recording head is in use, the debris is mixed in with the flow of ink, and clogs the nozzles.

Also in the case of the ink jet recording head manufacturing method in accordance with the present invention, the etching method used for etching a substrate from the reverse side thereof may be an isotropic etching method which uses nitric acid, a mixture of acids, or the like, an anisotropic etching method which uses an alkaline solution such as a water solution of KOH or TMAH, or similar chemical etching methods.

Further, the ink jet recording head manufacturing method may comprise a step for forming an orifice plate having orifices and liquid passages, on the surface of a substrate, on the side on which ejection pressure generation elements were formed. The orifice plate is formed through the following steps: a step in which a photosensitive resin is solvent coated, and the coated photosensitive resin is given a predetermined pattern by a photolithographic method; and a step in which a liquid passage formation member having a liquid passage formation pattern is formed of a dissolvable resin, and is covered with a resin which will become the orifice plate; and a step in which the liquid passage formation member is dissolved away.

According to another aspect of the present invention, an ink jet recording head is characterized in that the areas immediately next to the edge of the ink supply hole, on the obverse side of the substrate, are recessed from the area of the obverse surface of the substrate, on which the ejection pressure generation elements are present, and the protective layer covers a minimum area of the surface of this recessed area.

According to another aspect of the present invention, an ink jet recording head substrate for manufacturing an ink jet recording head which comprises an ink supply hole through which liquid is externally supplied, orifices through which liquid is ejected, a plurality of liquid passages extending from the ink supply hole to the orifices, and a plurality of ejection pressure generating portions disposed in the liquid passages, at a predetermined location, to generate the pressure for liquid ejection; and in which the ink supply hole was formed, as a through hole, in the substrate on which ejection pressure generation elements, as the ejection pressure generating portions, were present, is characterized in that it comprises: a substrate having the plurality of ejection pressure generation elements, and a groove(s) formed in the area of the surface of the substrate which is located next to the theoretical line corresponding in position to the edge(s) of the opening of the ink supply hole which will be formed later; a sacrificial layer, which was formed on the portion of the surface of the substrate which is next to the groove and corresponds in position to the theoretical center of the ink supply hole to be formed later, and which will be dissolved away by wet etching to form the ink supply hole; a protective layer formed on the surface of the groove and resistant to the wet etching process used for forming the ink supply hole; a passivation layer formed to cover the sacrificial layer and resistant to the wet etching process for forming the ink supply hole; an etching mask layer formed on the reverse surface of the substrate, that is, the surface opposite to the surface on which the plurality of ejection pressure generation elements are present, to form the ink supply hole, the etching mask layer having an opening which defines the area of the reverse surface of the substrate from which the wet etching process for forming the ink supply hole is to be started so that as the groove started from the reverse side of the substrate by the wet etching process for forming the ink supply hole grows, the inward edge, that is, the edge on the obverse side of the substrate, of the groove eventually falls within the range of the sacrificial layer.

In the case of an ink jet recording head manufacturing method which uses the above described ink jet recording head substrate, a first groove is formed from the reverse side of this ink jet recording head substrate, by wet etching, with the etching mask layer used as a mask. The wet etching process is continued until the end of the first groove, on the obverse side of the substrate, fully grows into the sacrificial layer and eliminates it. Then, the portion of the protective layer exposed by the growth of the first groove is removed. As a result, the first groove becomes connected to the groove(s) formed in the surface of the substrate on which the ejection pressure generation elements are present, thereby completing the ink supply hole.

During this process of forming the ink supply hole, the groove formed in the substrate by wet etching from the reverse side of the substrate grows past the borderline between the sacrificial layer and the passivation layer. While the groove is growing in the adjacencies of the borderline, the edge of the opening of the groove, on the obverse side of the substrate, comes into contact with the borderline, being thereby straightened. In other words, even if the edge of the opening of the groove, on the obverse side of the substrate, grows in a slightly irregular fashion due to the misalignment between the substrate and etching mask in terms of the relationship between the etching mask pattern and the crystal orientation of the substrate, and also, due to the deviation in the thickness of the silicon wafer, the irregularities of the edge are rectified while the groove is growing past the borderline. After being rectified at the borderline between the sacrificial layer and the passivation film, the edge of the opening of the groove, on the obverse side of the substrate, expands more widely, reaching thereby the groove(s) formed in the substrate from the obverse side of the substrate. As a result, a ridge(s) is formed by the portion of the protective layer which, at this stage, constitutes the inward wall of the groove formed from the obverse side of the substrate, and the surface of the groove formed from the reverse side of the substrate. Since the ridge is between the above described portion of the protective layer and the surface of the groove formed from the reverse side of the substrate, the etching speed does not accelerate at the ridge; in other words, the etching progresses at a stable rate across the etching front. As will be evident from the above description, using an ink jet recording head substrate in accordance with the present invention makes it possible to form the ink supply hole in a highly precise manner, so that the internal ridge of which, between the groove formed from the obverse side of the substrate and the groove formed from the reverse side of the substrate, comes to have a configuration that virtually matches a predetermined specification. Therefore, it is possible to afford a greater amount of latitude in designing the structure of the ink supply hole, and its adjacencies.

Further, in the case of the ink jet recording head manufacturing method which employs the ink jet recording head substrate in accordance with the present invention, the edge of the ink supply hole, on the obverse side of the substrate, results from the edge of the groove formed from the obverse side of the substrate. Therefore, using this ink jet recording head manufacturing method makes it possible to precisely position the edge of the ink supply hole, on the obverse side of the substrate, relative to the other structural components, for example, the ejection pressure generation elements which are present on the surface of the substrate on the obverse side, since the edge of the groove formed from the obverse side can be positioned directly relative to these structural components.

As will be evident from the above description, using the ink jet recording head substrate in accordance with the present invention makes it possible to manufacture an ink jet recording head the nozzles of which are uniform in ink passage conductance and are quickly and reliably refilled.

Further, the recess portion, immediately next to the edge of the ink supply hole, formed by forming a groove from the obverse side of the substrate, is covered with the protective film. Therefore, it is highly resistant to the corrosiveness of ink. Further, an anisotropic etching method, which creates a groove with a surface having a crystal orientation index of <111>, which is higher in resistance to the corrosiveness of alkaline substances, is used as the etching method for forming the groove from the reverse side of the substrate. Therefore, the surface of the ink supply hole is highly resistant to the corrosiveness of ink. In other words, using the ink jet recording head substrate in accordance with the present invention makes it possible to manufacture an ink jet recording head the entirety of which is highly resistant to the corrosiveness of ink.

The groove(s) to be formed in the obverse surface of the ink jet recording head substrate in accordance with the present invention may be in the form of a single (or two) relatively long groove(s) which extends in the adjacencies of a plurality of rows of ejection pressure generation elements, in parallel to the rows of ejection pressure generation elements, or in the form of a plurality of short grooves, provided one for each ejection pressure generation element, and aligned in two rows parallel to the rows of ejection pressure generation elements. In the case of the latter, the walls which separate two adjacent ink passages can be extended into the areas between the two adjacent short grooves; in other words, the walls can be extended to prevent the occurrence of cross-talk.

Further, the protective film and passivation film may be formed so that they are in contact with each other, with no gap between them, in the adjacencies of the opening of the ink supply hole, on the obverse side of the substrate. With the provision of this structural arrangement, the etching liquid is prevented from seeping onto the obverse side of the substrate, when wet etching the substrate from the reverse side. Therefore, even if the substrate is etched from the reverse side after the formation of the semiconductor circuit layer and nozzle formation layer on the obverse surface of the substrate, these layers are not adversely affected by the etching liquid. Also, instead of a processing method, such as sand blasting or laser etching, which generates debris, which causes nozzle blockage, a highly precise processing method, such as an anisotropic etching method, can be used to form the groove from the reverse side of the substrate.

As the protective film or passivation film, an inorganic film, such as a SiO film or SiNx film, or a laminar film comprising a SiOx film and a SiNx film, can be used. The protective film and passivation film may be formed of polyether-amide. The sacrificial layer can be formed of a polycrystalline silicon film or aluminum. As the etching mask layer, a SiOx film or a SiNx film can be used. As the substrate, a wafer, the crystal orientation index of which is <100> or <110>, can be used. Using such a wafer as the substrate makes it possible to form, in the substrate, a groove the surface of which is highly resistant to the corrosiveness of alkaline substances, from the reverse side of the substrate by anisotropic etching.

In the case of an ink jet recording head manufactured with the use of an ink jet recording head substrate in accordance with the present invention, the area(s) immediately next to the edge(s) of the ink supply hole is recessed. Therefore, even if the OH distance is reduced, the liquid passages remain relatively low in flow resistance, remaining therefore relatively fast in refilling speed. In other words, an ink jet recording head substrate in accordance with the present invention is suitable for forming an ink jet recording head which employs electro-thermal transducers as ejection pressure generation elements, which is required to have a short OH distance to record highly precise images, and which is required to be quickly refilled to record at a high speed.

The ink jet recording head in accordance with the present invention is characterized in that it is manufactured using an ink jet recording head substrate such as the above described one. According to another aspect of the present invention, an ink jet recording head is characterized in that the surface of the area(s) between each ink passage, and the edge of the opening of the ink supply hole, on the obverse side of the substrate, is sloped downward toward the edge, and this area is covered with a protective film resistant to the wet etching process used for forming the ink supply hole.

The ink jet recording head manufacturing method in accordance with the present invention is characterized in that it uses an ink jet recording head substrate such as the above described one. According to another aspect of the present invention, an ink jet recording head manufacturing method comprises: a step for forming a first groove in a substrate; a step for forming a plurality of ejection pressure generation elements as ejection pressure generation portions, next to the first groove; a step for forming a sacrificial layer dissolvable by a wet etching process used for forming an ink supply hole, on the side of the first groove opposite from the side on which the ejection pressure generation elements are present; a step for forming, on the surface of the first groove, a protective layer resistant to the wet etching process for forming the ink supply hole; a step for forming a passivation film resistant to the wet etching process for forming the ink supply hole, to cover the sacrificial layer; a step for forming an etching mask layer, on the surface of the substrate opposite from the surface on which the ejection pressure generation elements are present; a step for forming, in the substrate, a second groove, which reaches the passivation film and the protective layer, by wet etching the substrate from the reverse side, that is, the side opposite to the side on which the ejection pressure generation elements are present, with the etching mask used as a mask; and a step for removing the portion of the protective layer exposed by the formation of the second groove to connect the second groove to the first groove formed from the obverse side of the substrate, in order to complete the ink supply hole.

These and other objects, features, and advantages of the present invention will become more apparent upon consideration of the following description of the preferred embodiments of the present invention, taken in conjunction with the accompanying drawings.

BRIEF DESCRIPTION OF THE DRAWINGS

FIG. 1A is a plan view thereof, and FIG. 1B is a schematic sectional view thereof, at the line A—A in FIG. 1A.

FIG. 4A is a plan view thereof, and FIG. 4B is a schematic sectional view thereof, at the line A—A in FIG. 4A.

FIG. 5A is a plan view thereof, and FIG. 5B is a schematic sectional view thereof, at the line A—A in FIG. 5A.

FIG. 6A is a horizontal sectional view thereof, and FIG. 6B is a schematic sectional view thereof, at the line A—A in FIG. 6A.

FIG. 7A is a plan view thereof, and FIG. 7B is a schematic sectional view thereof, at the line A—A in FIG. 7A.

FIG. 9A is a plan view thereof, and FIG. 9B is a sectional view thereof at the line A—A in FIG. 9A.

FIG. 10A is a plan view thereof, and FIG. 10B is a sectional view thereof at the line A—A in FIG. 10A.

FIG. 11A is a plan view thereof, and FIG. 11B is a sectional view thereof at the line A—A in FIG. 11A.

FIG. 12A is a plan view thereof, and FIG. 12B is a sectional view thereof at the line A—A in FIG. 12A.

FIG. 13A is a plan view thereof, and FIG. 13B is a sectional view thereof at the line A—A in FIG. 13A.

FIG. 14A is a plan view thereof, and FIG. 14B is a sectional view thereof at the line A—A in FIG. 14A.

FIG. 15A is a plan view thereof, and FIG. 15B is a sectional view thereof at the line A—A in FIG. 15A.

FIG. 16A is a plan view thereof, and FIG. 16B is a sectional view thereof at the line A—A in FIG. 16A.

FIG. 17A is a plan view thereof, and FIG. 17B is a sectional view thereof at the line A—A in FIG. 17A.

FIG. 19A is a plan view thereof, and FIG. 19B is a sectional view thereof at the line A—A in FIG. 19A.

FIG. 20A is a plan view thereof, and FIG. 20B is a sectional view thereof at the line A—A in FIG. 20A.

FIG. 21A is a plan view thereof, and FIG. 21B is a sectional view thereof at the line A—A in FIG. 21A.

FIG. 22A is a plan view thereof, and FIG. 22B is a sectional view thereof at the line A—A in FIG. 22A.

FIG. 23A is a plan view thereof, and FIG. 23B is a sectional view thereof at the line A—A in FIG. 23A.

FIG. 24A is a plan view thereof, and FIG. 24B is a sectional view thereof at the line A—A in FIG. 24A.

FIG. 25A is a plan view thereof, and FIG. 25B is a sectional view thereof at the line A—A in FIG. 25A.

FIG. 26A is a plan view thereof, and FIG. 26B is a sectional view thereof at the line A—A in FIG. 26A.

FIG. 27A is a plan view thereof, and FIG. 27B is a sectional view thereof at the line A—A in FIG. 27A.

FIG. 29A is a perspective view of the ink jet recording head, without showing the orifice plate, and FIG. 29B is a sectional view thereof, at the line A—A in FIG. 29A.

DETAILED DESCRIPTION OF THE PREFERRED EMBODIMENTS

Hereinafter, the preferred embodiments of the present invention will be described with reference to the appended drawings.

Embodiment 1

Figure 1A:
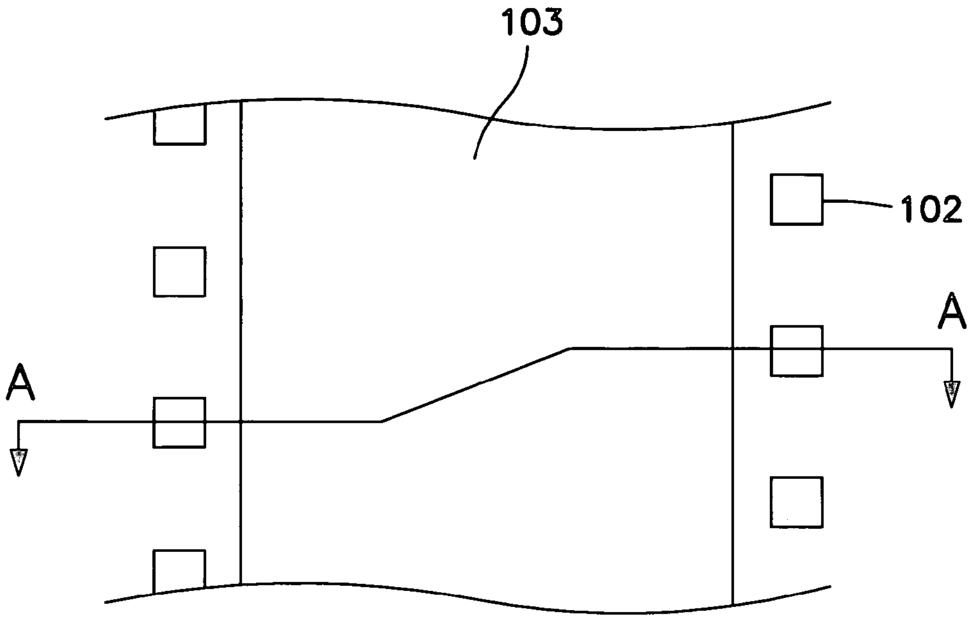
FIGS. 1A and 1B are schematic drawings of the substrate of the ink jet recording head in the first embodiment of the present invention.
Figure 1B:
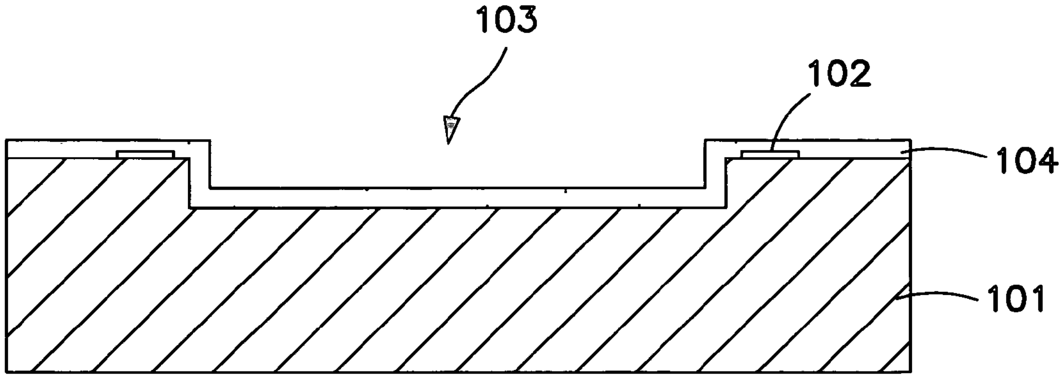

Referring to FIGS. 1A–3D, the ink jet recording head manufacturing method in the first embodiment of the present invention will be described. FIGS. 2A–3D are schematic drawings of the ink jet recording head, sequentially showing the ink jet recording head manufacturing steps, and FIGS. 1A and 1B are schematic drawings of the ink jet recording head substrate which has been completed through the step shown in FIG. 2A to the step shown in FIG. 2C; FIG. 1A is a plan view thereof, and FIG. 1B is a sectional view thereof at the line A—A in FIG. 1A. Each of the drawings in FIGS. 2A–3D is a sectional view of the substrate at a line comparable to the line A—A in FIG. 1A.

Referring to FIG. 1A, the ink jet recording head manufactured using the ink jet recording head manufacturing method in this embodiment has a substrate 101 on which a plurality of ejection pressure generation elements 102 for generating the pressure for ejecting ink (liquid) were formed. The substrate 101 is provided with a recess 103, which is on the obverse surface of the substrate 101, and occupies the area from the opening of the ink supply hole 110 (FIG. 3D, etc.) to the area next to where the ejection pressure generation elements 102 are located. The plurality of ejection pressure generation elements 102 are disposed at a predetermined pitch in two lines extending in the lengthwise direction of the recess 103, along the two lengthwise edges of the recess 103, one for one. The two lines of ejection energy generation elements 102 are offset by half of a pitch relative to each other. The substrate 101 is also provided with a semiconductor circuit including transistors and the like for driving the ejection pressure generation elements 102, and pads as electrodes for electrically connecting the recording head with the main assembly of a recording apparatus. However, these components are not shown in the drawings, in order to make the drawings easier to understand.

Figure 3A:
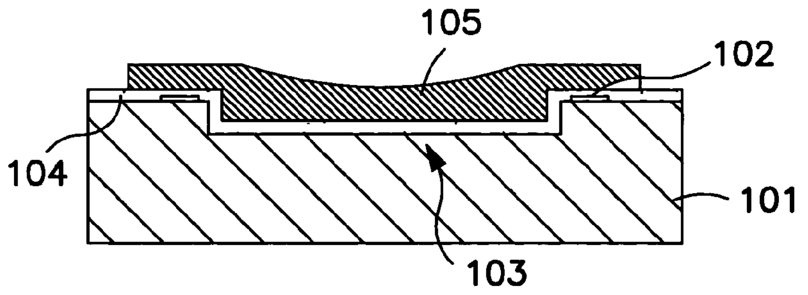
FIGS. 3A, 3B, 3C and 3D are schematic drawings of the ink jet recording head in the first embodiment of the present invention, showing the ink jet recording head manufacturing steps subsequent to the steps shown in FIGS. 2A, 2B and 2C.
Figure 3B:
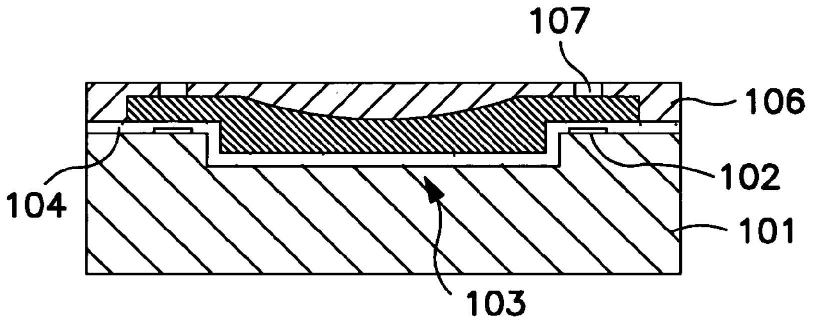
Figure 3C:
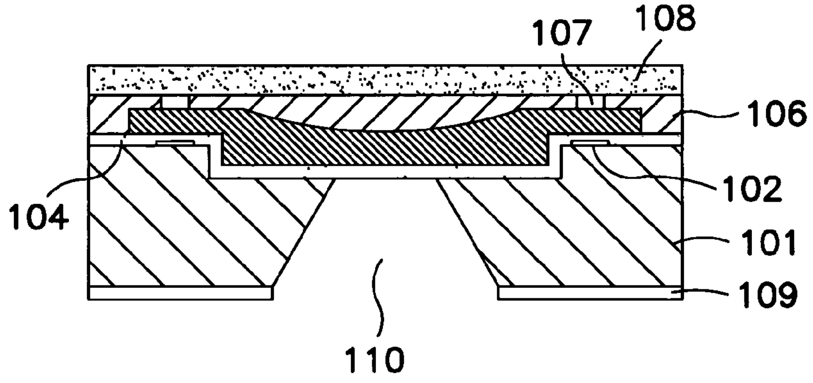
Figure 3D:
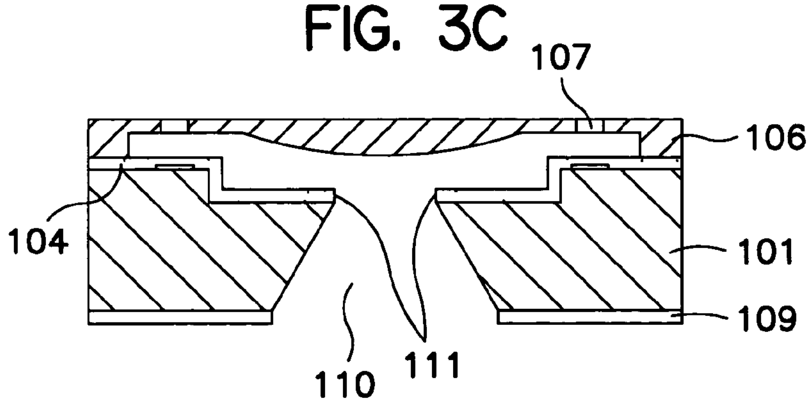

Referring to FIG. 3D, the bottom surface of the recess 103 is virtually parallel to the surface areas of the substrate 101, across which the ejection pressure generation elements 102 are formed. The recess 103 has a hole, in the center, created as a hole grown in the substrate by etching the substrate from the reverse side thereof to form the ink supply hole was connected to the bottom of the recess 103. Each of the two areas of the bottom surface of the recess 103 separated by this hole will become the recessed portion of the bottom surface of an ink passage, through the subsequent steps. The surface of this recessed portion and the surface of the ink supply hole 110 form a ridge 111 where they meet. The ink jet recording head is provided with an orifice plate 106 which has a plurality of nozzles, each of which comprises a passage extending from the ink supply hole 110 to the corresponding ejection pressure generation element 102, and an orifice 107, the center of which is aligned with that of the corresponding ejection pressure generation element 102 in the direction perpendicular to the surface of the ejection pressure generation element 102.

As described above, in the case of the ink supply passage in the ink jet recording head in this embodiment, the provision of the recess 103 provides an ink supply passage with a bottom surface, a part of which is recessed relative to the surface area of the substrate 101 across which the plurality of ejection pressure generation elements 102 are present. Therefore, even if the OH distance has been reduced to reduce liquid droplet size, the flow resistance encountered by the ink in the ink supply passage remains relatively small, making it possible to maintain the recording speed at a relatively higher level. On the obverse surface (top surface in the drawings), inclusive of the recess 103, the substrate 101 is covered with a protective layer 104 resistant to the etching process for forming the ink supply hole 110.

Next, the ink jet recording head manufacturing steps in this embodiment will be sequentially described.

Figure 2A:
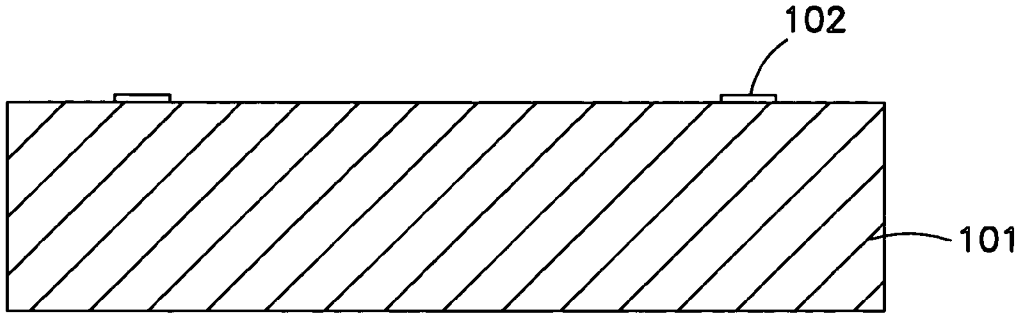
FIGS. 2A, 2B and 2C are schematic sectional views of the ink jet recording head in the first embodiment of the present invention, sequentially showing the ink jet recording head manufacturing steps.

In this embodiment, a piece of single crystal silicon wafer, the crystal orientation of the surface of which is <100>, is used as the substrate 101. In the first step, a plurality of heat generating resistors as the ejection pressure generation elements 102, the driver circuit (unshown) for driving the heat generating resistors, and the electrical pads (unshown) for exchanging signals between the ink jet recording head and the main assembly of a recording apparatus, are formed on the surface of the substrate 101 with the use of one of the widely used semiconductor manufacturing processes (FIG. 2A).

Figure 2B:
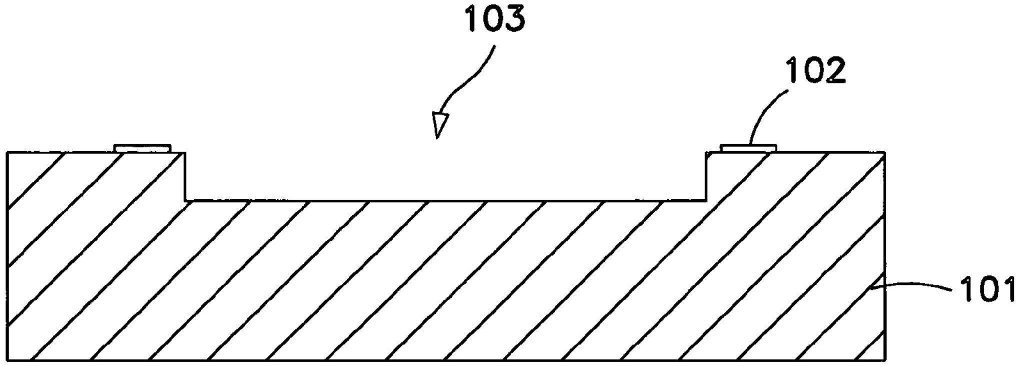

Next, a layer of resist is formed in a predetermined pattern on the obverse side of the substrate 101. Then, the obverse side of the substrate 101 is etched by a reactive ion etching method which uses the above described resist layer as a mask, creating the recess 103 which extends, in the width direction of the recess 103, from the area corresponding in position to the ink supply hole 110 (FIG. 3C, etc.), to the immediate adjacencies of the rows of the ejection pressure generation elements 102. Thereafter, the resist layer is removed (FIG. 2B).

Next, a silicon nitride (SiN) film, as the protective layer 104, is formed across the obverse surface of the substrate 101, in a pattern which covers a predetermined area (FIG. 2C); the protective layer 104 is patterned to cover the entire surface of the recess 103 so that when the ink supply hole is formed, the ridges 111 (FIG. 3D) remains covered. Through the above described steps, the ink jet recording head substrate having the structure which characterizes the present invention is completed.

Next, the obverse surface of the substrate 101 is solvent coated with polymethyl-isopropenyl-ketone, that is, a UV resist, which can be dissolved away later. The method used for this process is a spin coating method. This resist layer is exposed to UV light, and developed, forming the liquid passage formation pattern 105 (FIG. 3A).

Next, the entirety of the obverse surface of the substrate 101, inclusive of the surface of the liquid passage formation pattern 105, is coated with epoxy resin of a cation polymerization type, which is a negative resist, forming an orifice plate 106 which will be formed into the top wall of each ink passage, and the lateral walls between adjacent ink passages.

This negative resist layer is exposed to a photo-mask having a predetermined pattern, and developed, removing thereby the portions of the negative resist layer corresponding in position to the orifices 107 and electrical pads (FIG. 3B).

Figure 2C:
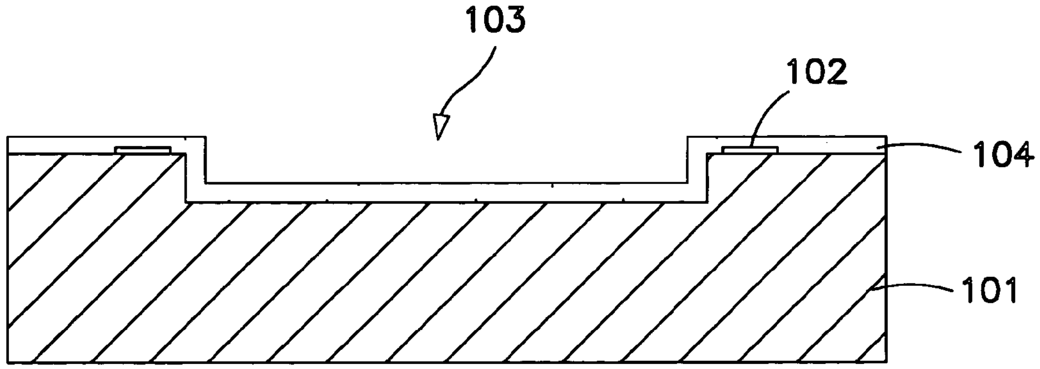

Next, the outward surface of the orifice plate, inclusive of the orifices 107, is coated with a nozzle protective resin 108 containing cyclized rubber, in order to protect the nozzle portions. Then, a SiN film is formed across the reverse surface of the substrate 101 with the use of a plasma CVD method. Incidentally, this SiN film may be formed in advance at the same time as the formation of the protective layer 104 on the obverse surface of the substrate 101, which is shown in FIG. 2C.

Next, a resist layer is formed on the SiN film on the reverse surface of the substrate 101, covering the entirety of the reverse surface except for the center area which corresponds to the center portion of the recess 103 on the front side of the substrate 101. Then, the SiN film on the reverse surface of the substrate 101 is removed by dry etching, with this resist layer functioning as a mask. Then, the resist layer is removed. As a result, a reverse surface mask layer 109 is formed, which has a hole corresponding in size and location to the opening of the ink supply hole, which will be formed next.

Next, the reverse surface of the substrate 101 is dipped in to a mixture of nitric acid, hydrofluoric acid, and acetic acid, in order to remove the portion of the substrate 101 corresponding to the ink supply hole 110, through the hole of the reverse surface mask layer 109, using an anisotropic etching method. The anisotropic etching process is continued until the hole created by the etching reaches the inward surface of the protective layer 104 of the recess 103 of the substrate 101. As a result, the ink supply hole 110 is formed (FIG. 3C).

Next, the portion of the protective layer 104 which has been exposed due to the formation of the ink supply hole 110 is removed by chemical dry etching. Then, the nozzle protective resin layer 108 covering the orifice plate, inclusive of the nozzles, is removed with xylene. Thereafter, the entirety of the substrate 101, inclusive of the elements formed thereon, is subjected to ultrasonic waves while being dipped in ethyl lactate. As a result, the UV resist in the pattern of the liquid passage 105 is dissolved away (FIG. 3D).

Although not shown in the drawings, the ink jet recording head described above can be formed in large numbers at the same time, on a single piece of silicon wafer which constitutes the substrate 101. When a large number of the ink jet recording heads is formed at the same time on a single piece of silicon wafer, the silicon wafer is diced to separate the ink jet recording heads after the formation of the ink jet recording heads thereon.

In the case of the above described ink jet recording head manufacturing method in this embodiment, when removing the part of the substrate 101 from the reverse side, by the anisotropic etching method, the protective layer 104 is present on the bottom surface of the recess 103 on the obverse side of the substrate 101. Therefore, the ridges 111 formed by the bottom surface and the surface of the ink supply hole 110 are not exposed to the etchant from the obverse side of the substrate. Therefore, it does not occur that the etching speed suddenly increases in the adjacencies of the ridges 111; in other words, the etching process progresses at a constant speed, making it possible to form the ridges 111 in a highly precise manner, so as to virtually match a predetermined specification.

As will be evident from the above explanation, the ink jet recording head manufactured through the manufacturing method in this embodiment is provided with ink supply passages, the bottom surface of each of which is provided with a recess portion. Therefore, even though the OH distance of the head has been reduced, the flow resistance encountered by the ink in the ink supply passage has not substantially increased, making it possible for the ink passage to be quickly refilled with ink. Also in the case of this ink jet recording head, the ridges to be formed by the recess portion of the bottom surface of the ink passage and the surface of the ink supply hole 110 can be precisely formed virtually to match the desired specification, making it possible to form a plurality of ink supply passages leading to nozzles, uniform in flow resistance. Therefore, all the ink passages can be reliably refilled.

Also in the case of this ink jet recording head, the surface of the recess 103 is covered with the protective layer 104, being prevented from being corroded by ink. Further, this protective layer 104 can be given the function of preventing the portions of the lateral surfaces of the functional layers, for example, the circuit layer for driving the ejection pressure generation elements 102, exposed on the recess 103 side, from being corroded by ink.

Also in the case of the ink jet recording head manufactured using the manufacturing method in this embodiment, providing the bottom wall of the ink passage with the recessed portion resulting from the recess 103 provides the bottom wall with a stepped portion, as shown in FIG. 3D. The stepped portion is thought to offer the following benefit. That is, during the long lifespan of ink jet recording head usage, air or the like sometimes enters the ink jet recording head, forming unwanted bubbles, and these unwanted bubbles are trapped by the stepped portion created by the provision of the recessed portion resulting from the recess 103. The presence of these bubbles in the adjacencies of the ejection pressure generation elements 102 sometimes has adverse effects on ink ejection; for example, the pressure generated by the ejection pressure generation elements 102 for ink ejection is absorbed by these unwanted bubbles. In the case of the ink jet recording head manufactured with the use of the ink jet recording head manufacturing method in this embodiment, however, these unwanted bubbles are trapped by the stepped portion of the bottom wall of the ink passage, which is away from the ejection pressure generation elements 102. Therefore, the above described adverse effects of these unwanted bubbles are minimized.

Incidentally, in this embodiment, silicon nitride is used as the material for the protective layer 104. However, a different material resistant to the etchant for forming the ink supply hole 110 may be used in place of silicon nitride. For example, silicon oxide, silicon oxide-nitride, as well as metals such as Ta, Cu, Au, Pt, etc., alloys thereof, or organic substances such as polyamide, polyether-amide, or the like, may be used. Further, the protective layer 104 may be formed so that not only does it cover the lateral and bottom walls of the recess 103, but also the ejection pressure generation elements 102 and driving circuit therefor formed on the substrate 101; in other words, the protective layer 104 may be formed to cover the entirety of the obverse side of the substrate 101, inclusive of the elements formed thereon. With such coverage by the protective layer 104 as described above, the ejection pressure generation elements 102 and driving circuit therefor can be prevented from being corroded by ink.

Embodiment 2

Figure 4A:
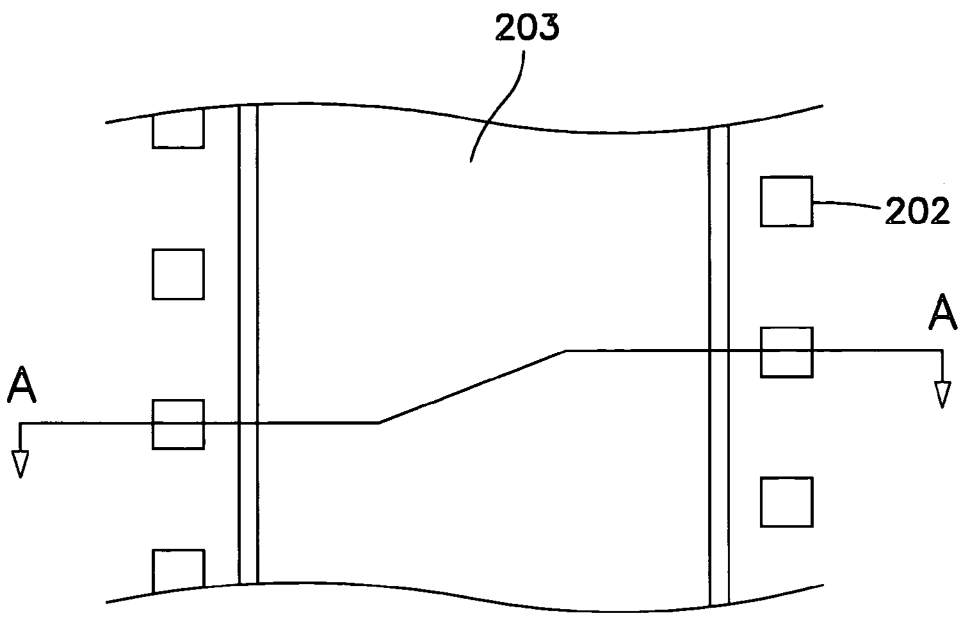
FIGS. 4A and 4B are schematic drawings of the substrate of the ink jet recording head in the second embodiment of the present invention.
Figure 4B:
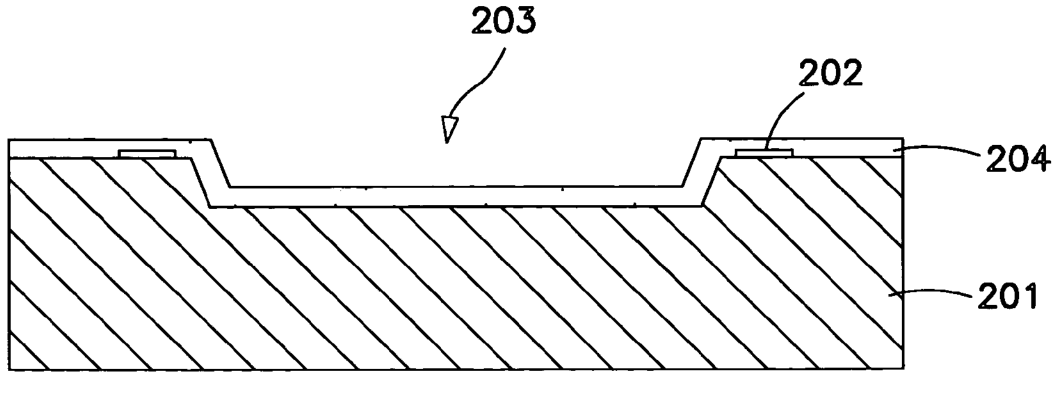

Next, referring to FIGS. 4A and 4B, the second embodiment of the present invention will be described. FIGS. 4A and 4B are schematic drawings of the ink jet recording head substrate in this embodiment, after the completion of the manufacturing steps from the first step to the step comparable to the step shown in FIG. 2C; FIG. 4A is a plan view thereof, and FIG. 4B is a sectional view thereof at the line A—A in FIG. 4A.

In this embodiment, the recess 203 is formed by an anisotropic etching method. With the use of this etching method, the lateral walls of the recess 203 become slanted. The ink jet recording head manufacturing steps in this embodiment other than the step for forming the recess 203 are the same as those in the first embodiment.

Therefore, the ink jet recording head manufactured with the use of the ink jet manufacturing method in this embodiment is virtually identical to that manufactured with the use of the method in the first embodiment, except that the lateral walls of the recessed portion of each ink passage, which connect the bottom wall of the recess 203 and the surface area of the substrate 201 on which the ejection pressure generation elements 202 are formed, are slanted. The surface of this recess 203 is covered with the protective layer 204. Therefore, it is not only possible for the substrate 201 to be precisely etched in order to form the ridges, to be formed by the bottom surface of the recess 203 and the surface of the ink supply hole, virtually matching a predetermined specification, but also to form ink passages, the recessed portions of the bottom surfaces of which are highly resistant to the corrosiveness of alkaline ink.

Incidentally, not only may the recess 203 be formed with the use of a chemical method, for example, the anisotropic etching method used in this embodiment, the reactive ion etching method used in the first embodiment, a wet etching method, or a chemical dry etching method, but also a physical method, such as a laser processing method, or a mechanical method, such as drilling or end milling, may be used.

It is thought that the protective layer 204 can be used to seal therein the debris resulting from the formation of the recess 203, in particular, the debris generated when the substrate 201 is etched using a mechanical process to form the recess 203. Confining the debris such as that described above prevents the debris from mixing in with flow of ink during recording head usage, preventing thereby the nozzles from being clogged up by the debris.

Embodiment 3

Figure 5A:
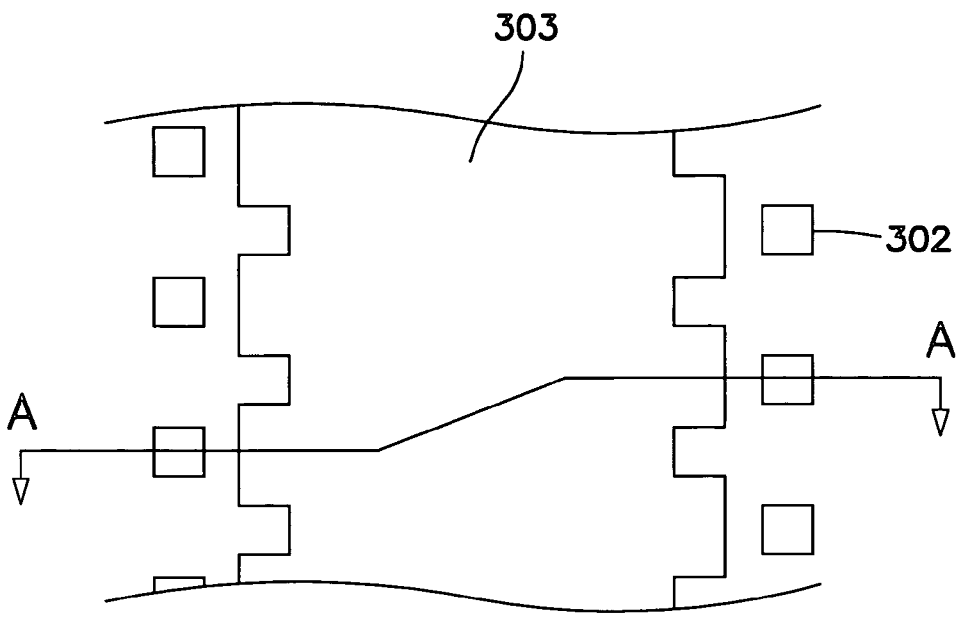
FIGS. 5A and 5B are schematic drawings of the substrate of the ink jet recording head in the third embodiment of the present invention.
Figure 5B:
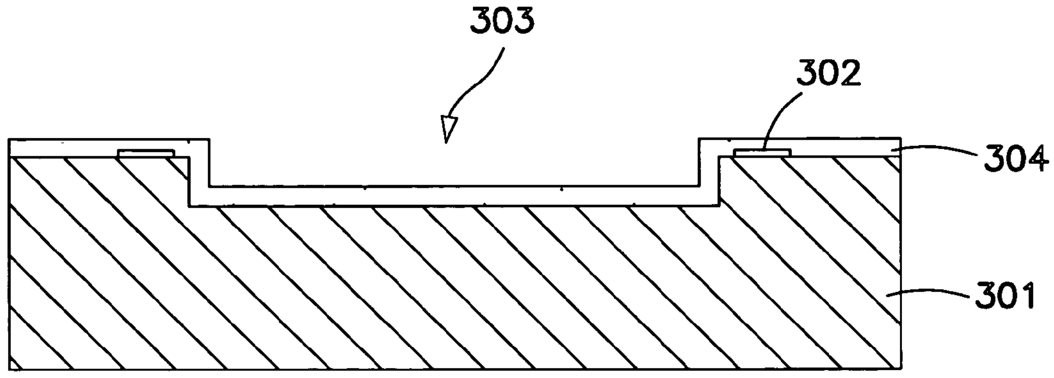
Figure 6A:
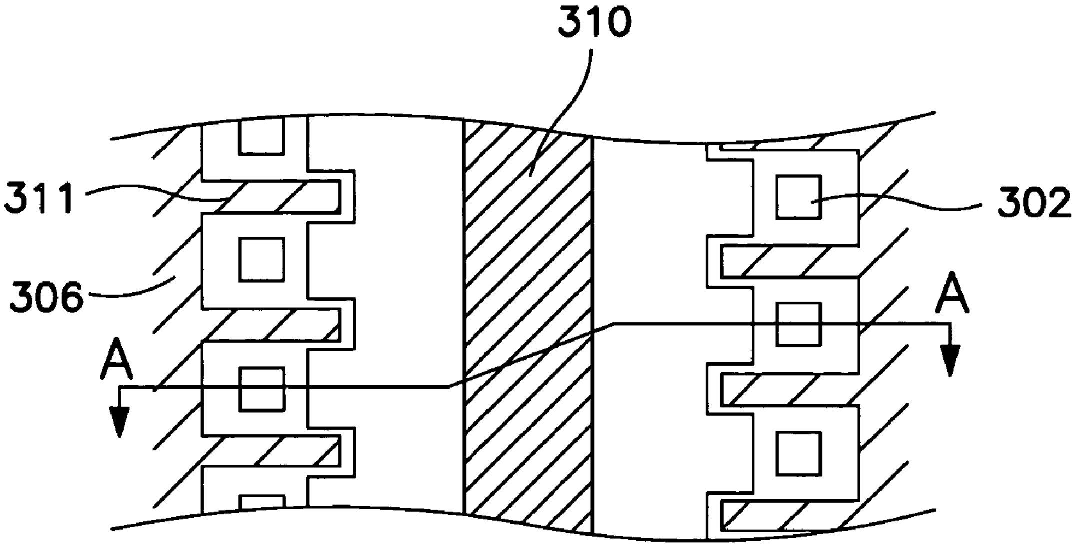
FIGS. 6A and 6B are schematic drawings of the substrate of the ink jet recording head in the third embodiment of the present invention.
Figure 6B:
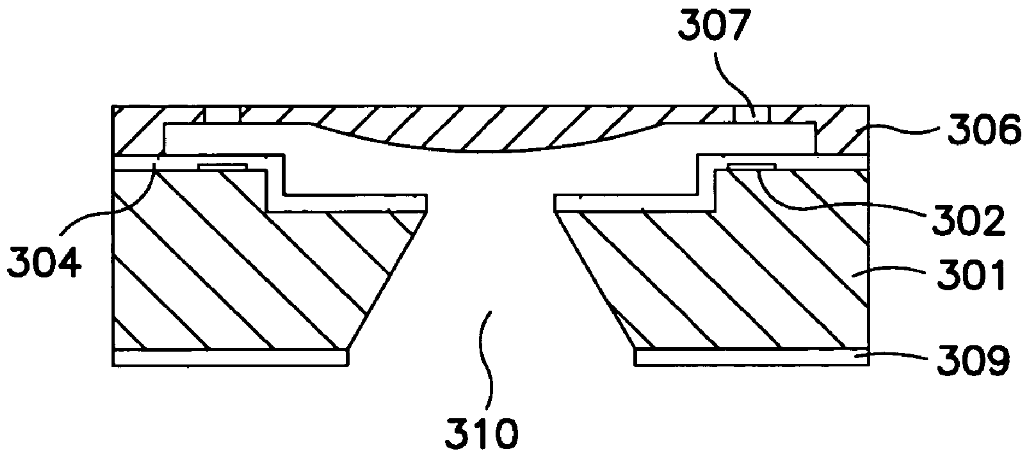

Next, referring to FIGS. 5A–6B, the third embodiment of the present invention will be described. FIGS. 5A and 5B are schematic drawings of the ink jet recording head substrate in this embodiment, after the completion of the manufacturing steps from the first step to the step comparable to the step in the first embodiment shown in FIG. 2C; FIG. 5A is a plan view thereof, and FIG. 5B is a sectional view thereof at the line A—A in FIG. 5A. FIGS. 6A and 6B are schematic drawings of the completed ink jet recording head; FIG. 6A is a horizontal sectional view thereof, and FIG. 6B is a vertical sectional view thereof at the plane A—A in FIG. 6A.

Referring to FIG. 5A, the recess 303 in this embodiment has a plurality of rectangular appendages extending toward the ejection pressure generation elements, one for one. Thus, after the formation of the recess 303 in the obverse surface of the substrate, the remaining portion of the obverse surface of the substrate is shaped so that it has a plurality of appendages extending between pairs of adjacent appendages of the recess 303, one for one, toward the ink supply hole 310, from between pairs of adjacent ejection pressure generation elements aligned at a predetermined pitch. A recess such as the recess 303 in this embodiment can be formed by removing the portion of the substrate corresponding to the recess 303, with the use of a reactive ion etching method, after forming a resist layer on the obverse surface of the substrate 301, in the above described pattern.

Next, referring to FIG. 6A, the orifice plate 306 is formed so that the liquid passage walls 311 which are integral parts of the orifice plate 306, extend toward the ink supply hole 310, virtually to the ends, one for one, of the above described appendage portions of the obverse surface of the substrate, which extend toward the ink supply hole from between adjacent pairs of ejection pressure generation elements aligned at a predetermined pitch.

The manufacturing steps in this embodiment can be carried out as those in the first embodiment, except that in this embodiment, the ink supply hole 310 is formed by anisotropic etching which uses a water solution of TMAH.

In the case of this embodiment, the recess 303 has a plurality of rectangular appendages, which extend to the immediate adjacencies of ejection pressure generation elements 302, one for one, not only effectively reducing the flow resistance of the ink supply passage, but also making the liquid passage walls 311 long enough to effectively prevent so-called cross talk, that is, the phenomenon that the ink ejection pressure generated in a given nozzle propagates to adjacent nozzles.

Embodiment 4

Figure 7A:
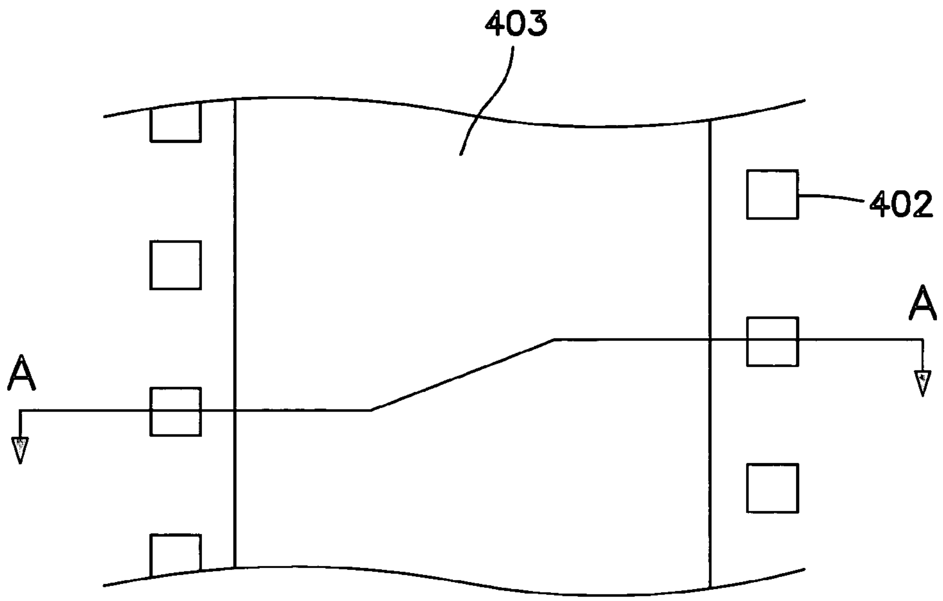
FIGS. 7A and 7B are schematic drawings of the substrate of the ink jet recording head in the fourth embodiment of the present invention.
Figure 7B:
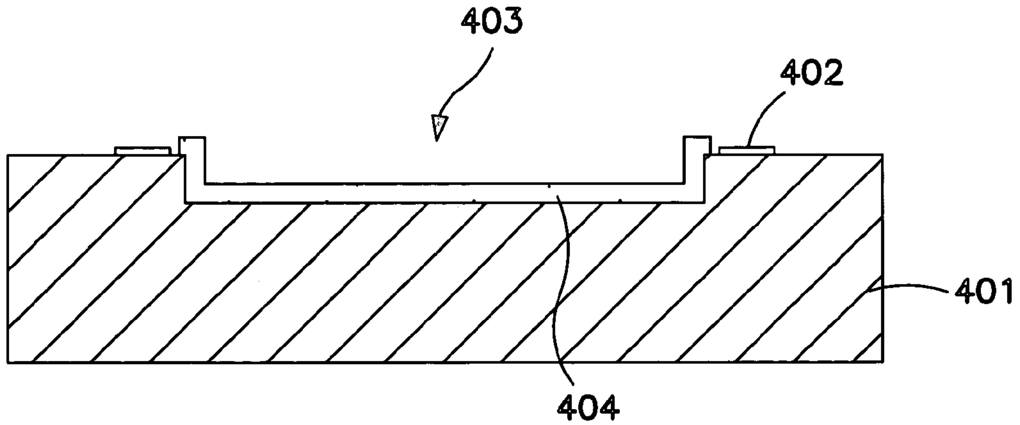

Next, referring to FIGS. 7A and 7B, the fourth embodiment of the present invention will be described. FIGS. 7A and 7B are schematic drawings of the ink jet recording head substrate in this embodiment, after the completion of the manufacturing process from the first step to the step comparable to the step in the first embodiment shown in FIG. 2C; FIG. 7A is a plan view thereof, and FIG. 7B is a vertical sectional view thereof at the line A—A in FIG. 7A.

Referring to FIG. 7B, in this embodiment, the protective layer 404 is left to cover only the surface of the recess 403. The manufacturing steps in this embodiment other than the step for leaving the protective layer 404 in the pattern described above can be carried out as those in the first embodiment.

Also in the case of the structural arrangement in this embodiment, the formation of the protective layer 404 makes it possible not only to precisely etch the substrate so that the ridges to be formed by the bottom surface of the recess 403 and the surface of the ink supply hole, are formed in a highly precise fashion, virtually matching a predetermined specification, but also to make the recess 403 highly resistant to the corrosiveness of the alkaline ink.

Embodiment 5

Figure 8A:
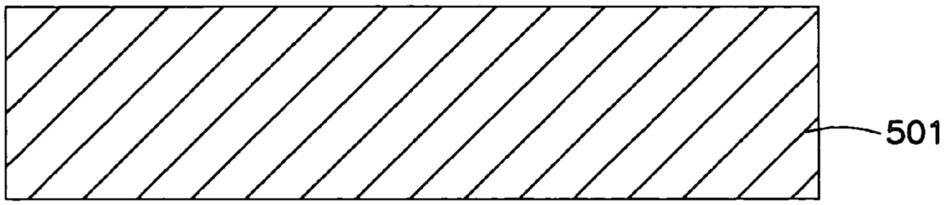
FIGS. 8A, 8B, 8C and 8D are schematic sectional views of the ink jet recording head in the fifth embodiment of the present invention, sequentially showing the ink jet recording head manufacturing steps.
Figure 8B:
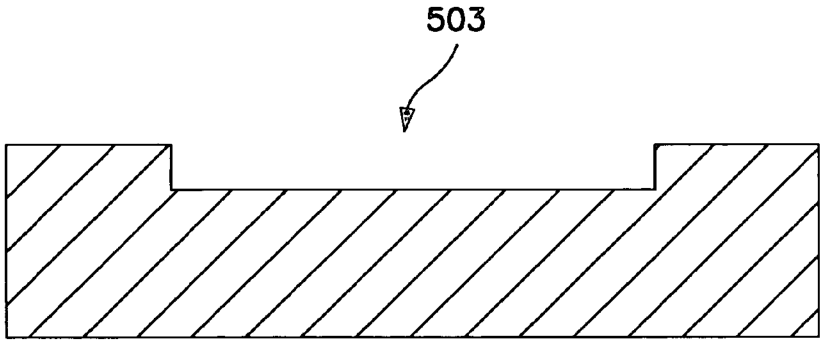

Next, referring to FIGS. 8A and 8B, the fifth embodiment of the present invention will be described. FIGS. 8A and 8B are schematic sectional views of the ink jet recording head in this embodiment, sequentially showing the ink jet recording manufacturing method in this embodiment from the first step to the step comparable to the step in the first embodiment shown in FIG. 2C.

Next, the ink jet recording head manufacturing steps in this embodiment will be described in the order in which they are carried out.

Also in this embodiment, a piece of single-crystal silicon wafer, the crystal orientation of the surface of which is <100> (FIG. 8A) is prepared as a substrate, that is, the substrate 501, and the recess 503 is formed (FIG. 8B) in the obverse surface of the substrate 501, by removing the portion of the substrate 501 from the area corresponding to the ink supply hole to the adjacencies of the areas across which the ejection pressure generation elements 502 are to be formed, as in the case of the first embodiment.

Figure 8C:
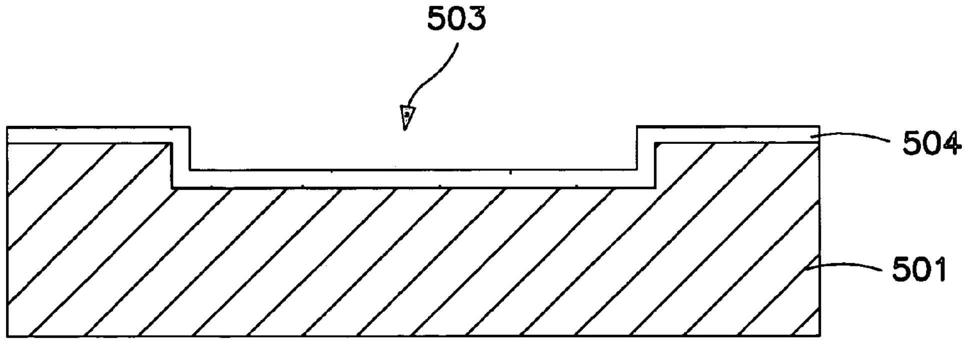

Next, the driving circuit for the ejection pressure generation elements 502 are formed on the obverse surface of the substrate 501. During this step, a SiO film, which is electrically insulating, is formed as one of the functional layers of the driving circuit, in a predetermined pattern, with the use of a plasma CVD method, across the area inclusive of the recess 503. This SiO film is used as the protective layer 504, which is comparable in function to the protective layers in the first to fourth embodiments (FIG. 8C). In other words, this protective layer 504 improves the level of precision with which the ridges are formed by the surface of the ink supply hole and the bottom surface of the recess 503, by preventing the etchant from bleeding onto the obverse side of the substrate 501 while etching the substrate 501 from the reverse side to form the ink supply hole in a subsequent step. Further, the presence of this protective layer 504 makes the walls of the recess 503, that is, the recessed portion of the bottom surface of the ink passage, highly resistant to the corrosiveness of ink.

Figure 8D:
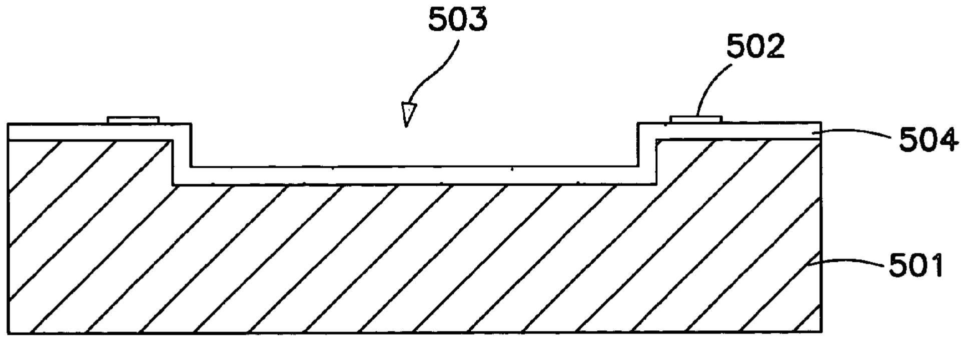

After the formation of the driving circuit through the above described steps, the heat generating resistors as the ejection pressure generation elements 502 are formed (FIG. 8D). The steps thereafter in this embodiment are the same as those in the first embodiment, and can be carried out as in the first embodiment.

In the case of this embodiment, the protective layer 504 can be formed at the same time as one or more of the functional layers of the driving circuit are formed on the substrate 501, making it possible to improve manufacturing efficiency.

Embodiment 6

Figure 16A:
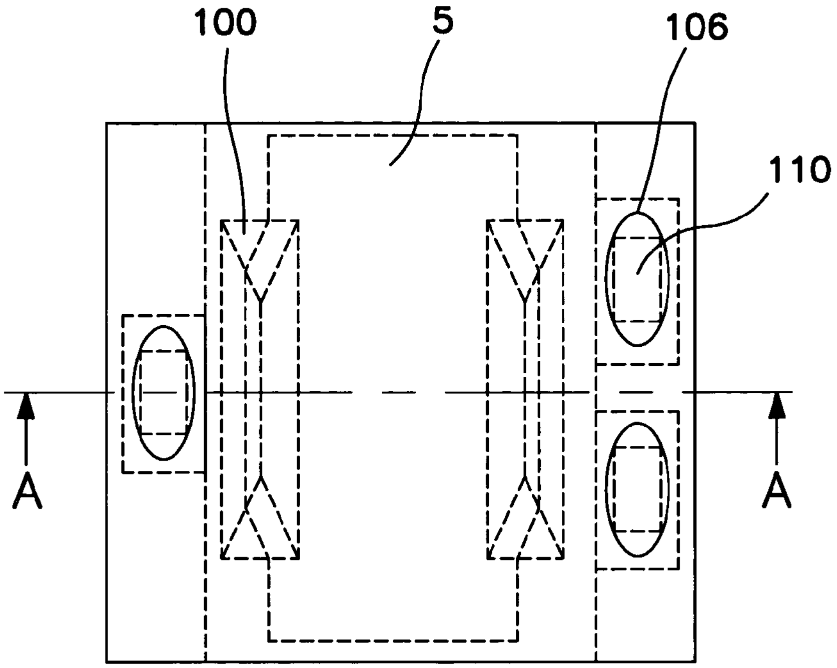
FIGS. 16A and 16B are schematic drawings of the ink jet recording head in the sixth embodiment of the present invention, showing the ink jet recording head manufacturing step immediately subsequent to the step shown in FIGS. 15A and 15B.
Figure 16B:
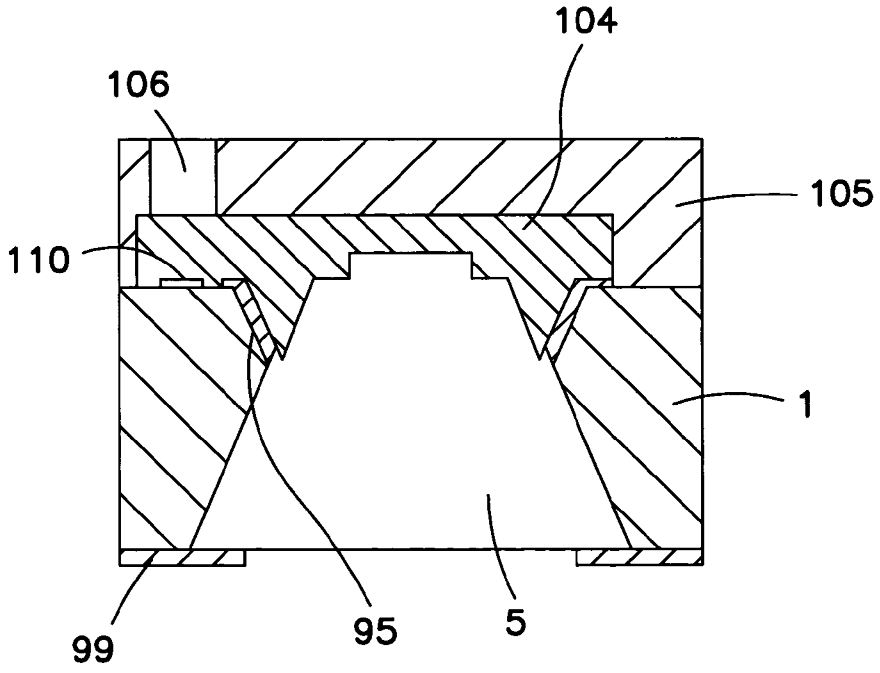
Figure 17A:
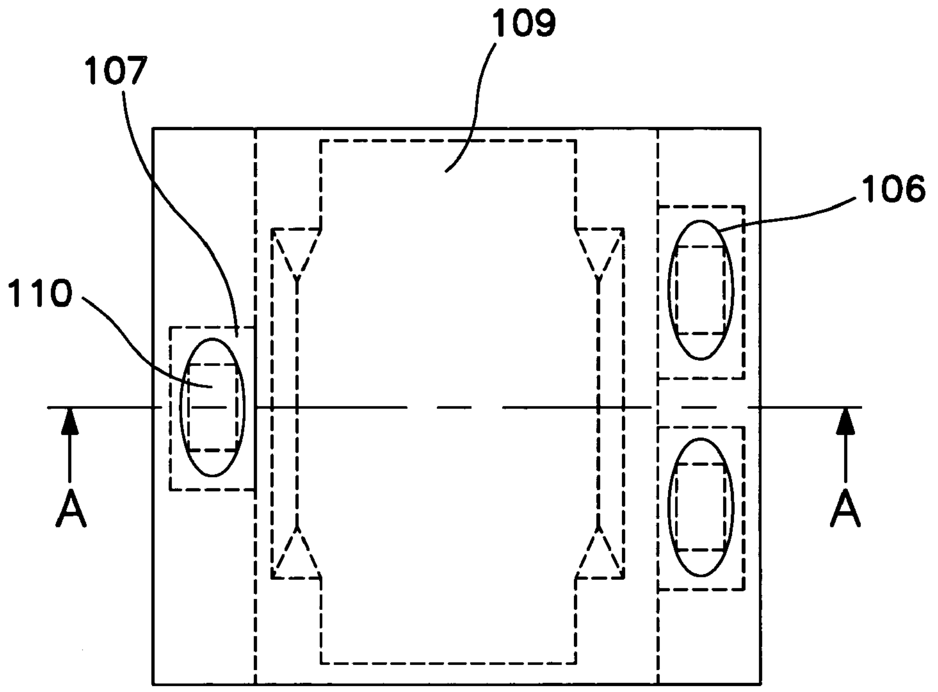
FIGS. 17A and 17B are schematic drawings of the ink jet recording head in the sixth embodiment of the present invention, showing the ink jet recording head manufacturing step immediately subsequent to the step shown in FIGS. 16A and 16B.
Figure 17B:
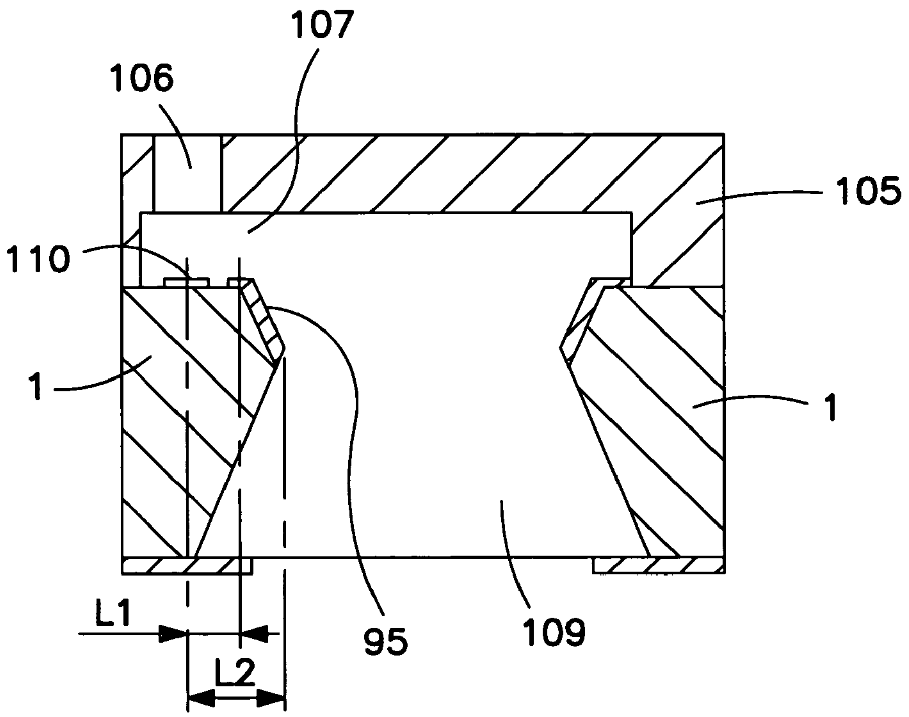
Figure 18:
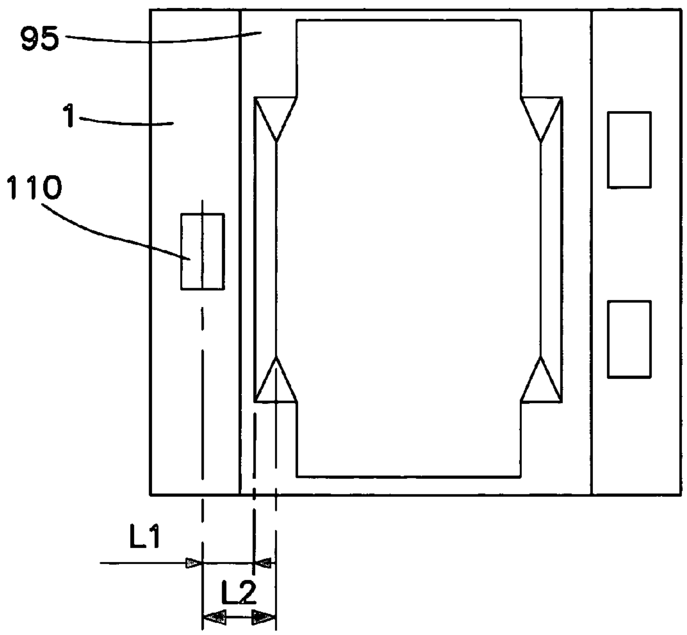
FIG. 18 is a schematic plan view of the ink jet recording head in the sixth embodiment of the present invention which has been completed through the steps shown in FIGS. 9A–17B, without showing the nozzle layer.

Referring to FIGS. 9A-18, the ink jet recording head manufacturing method in the sixth embodiment of the present invention will be described. FIGS. 9A–17B are schematic drawings of the ink jet recording head in this embodiment, showing the ink jet recording head after the completion of the manufacturing steps, one for one, in the order in which the steps are carried out. In the drawings, the figure designated as "A" is a plan view of the ink jet recording head in this embodiment, and the figure designated as "B" is a vertical sectional view thereof at the line A—A in the plan view "A". FIG. 18 is a plan view of the completed ink jet recording head shown in FIGS. 17A and 17B. In FIG. 18, the nozzle layer is not shown.

Referring to FIGS. 17A-18, the ink jet recording head manufactured with the use of the ink jet recording head manufacturing method in this embodiment has a substrate 1, on which a plurality of heaters (electro-thermal transducer elements) 110, as ejection pressure generation elements, for heating the ink (liquid) to generate ink (liquid) ejection pressure by generating bubbles in the ink (liquid) are formed. Although there are also formed on the substrate 1 a semiconductor circuit, inclusive of transistors or the like, for driving the heaters 110, and electrical pads for maintaining electrical connection between the recording head and the main assembly of a recording apparatus, these are not shown, in order to make the drawings easier to understand.

The substrate 1 is provided with an ink supply hole 109, which is a through hole. The heaters 110 are disposed in two lines along the edges of the ink supply hole 109, on the obverse side of the substrate. Although only three heaters 110 are shown in the drawings in order to make it easier to understand the drawings, the ink jet recording head manufacturing method in this embodiment can be used to manufacture an ink jet recording head having a much larger number of heaters 110. These heaters 110 are disposed in two straight lines, one line on each side of the ink supply hole 109, at a predetermined pitch. In the direction in which the heaters 110 are aligned, the heaters 110 on one side of the ink supply hole 109 are offset by half of a pitch from those on the other side. There is also on the substrate 1 the nozzle layer 105 having a plurality of the nozzles. Each nozzle has an ink passage 107 and an orifice 106. The ink passage 107 extends from the ink supply hole 109 over the heater 110, and the orifice 106 opens at the obverse surface of the substrate 1 and is correspondent in position to the heater 110.

Next, the ink jet recording head manufacturing steps in this embodiment will be described in the order in which they are carried out.

Figure 9A:
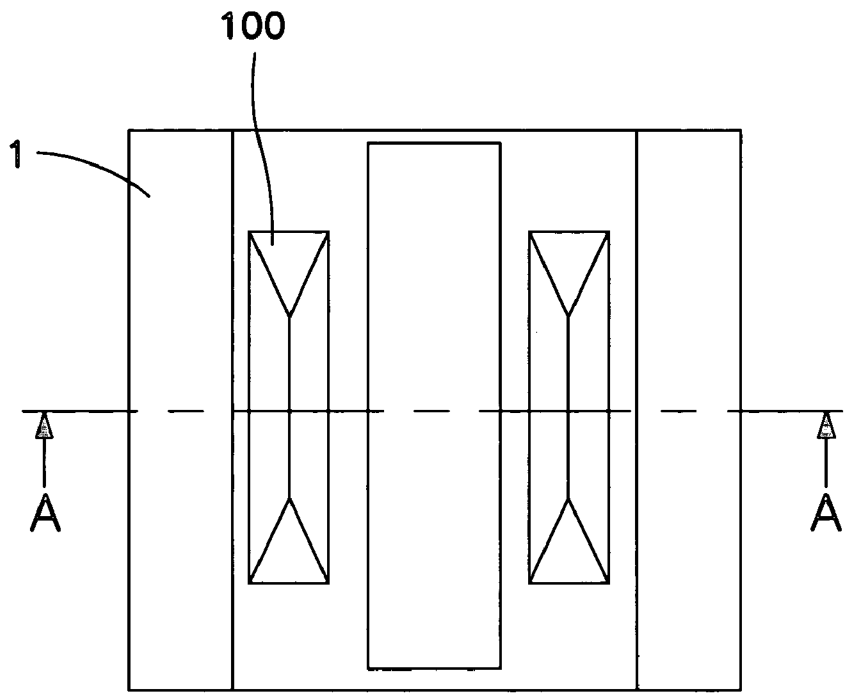
FIGS. 9A and 9B are schematic drawings of the ink jet recording head in the sixth embodiment of the present invention, showing one of the ink jet recording head manufacturing steps.
Figure 9B:
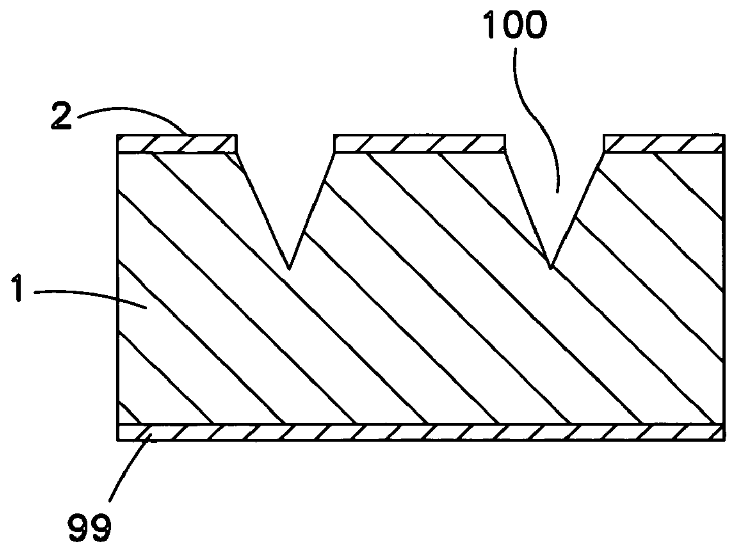

In this embodiment, a silicon wafer, the crystal orientation index of which is <100>, is used as the substrate 1. First, a SiNx film, which functions as the obverse surface etching mask layer 2 and reverse surface etching mask layer 99 shown in FIGS. 9A and 9B, are formed to a thickness of 100 nm on the obverse and reverse surfaces of the substrate 1. Then, a photo-resist layer is formed in a predetermined pattern on the silicon nitride film on the obverse surface of the substrate 1 with the use of a photolithographic process. Then, the silicon nitride film is etched by a reactive ion etching method which uses $CF_4$ gas, with this photo-resist layer used as a mask. Then, the photo-resist layer is peeled away, effecting thereby on the obverse surface of the substrate 1, the surface etching mask layer 2 having a pair of elongated openings as shown in FIG. 9A. The pair of elongated openings are on the ink supply hole side of the area across which two lines of heaters will be formed in one of the subsequent steps, and the elongated openings extend in the direction of the two lines of heaters.

Next, the substrate 1 is etched by an anisotropic etching method with the surface etching mask layer 2 used as a mask, effecting thereby two grooves 100 in the obverse surface of the substrate 1. As the etching liquid, TMAH was used at a temperature of 83° C., and a concentration of 22%. The rate of etching was 0.68 μm/min.

Figure 10A:
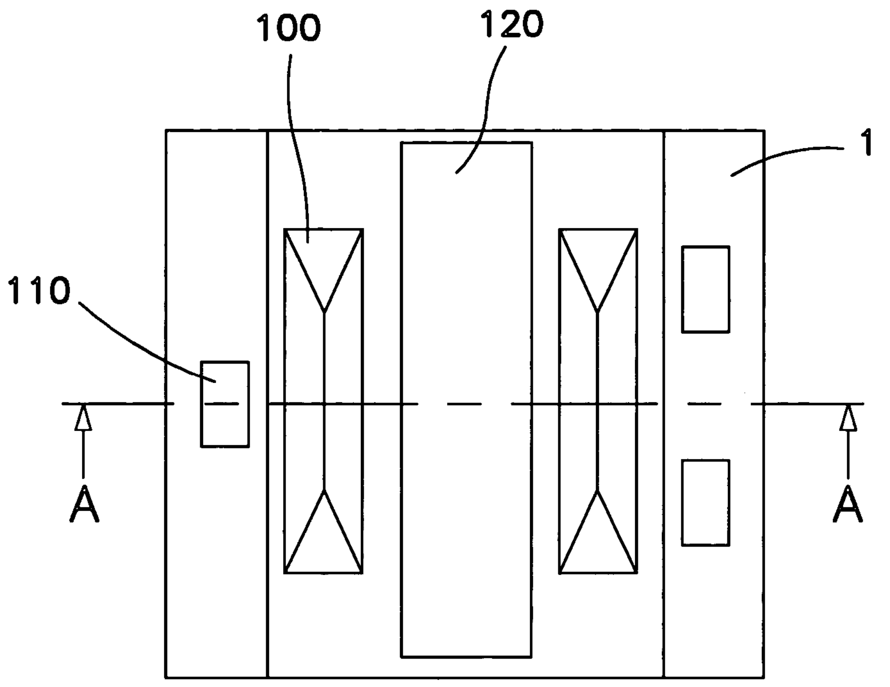
FIGS. 10A and 10B are schematic drawings of the ink jet recording head in the sixth embodiment of the present invention, showing the ink jet recording head manufacturing step immediately subsequent to the step shown in FIGS. 9A and 9B.
Figure 10B:
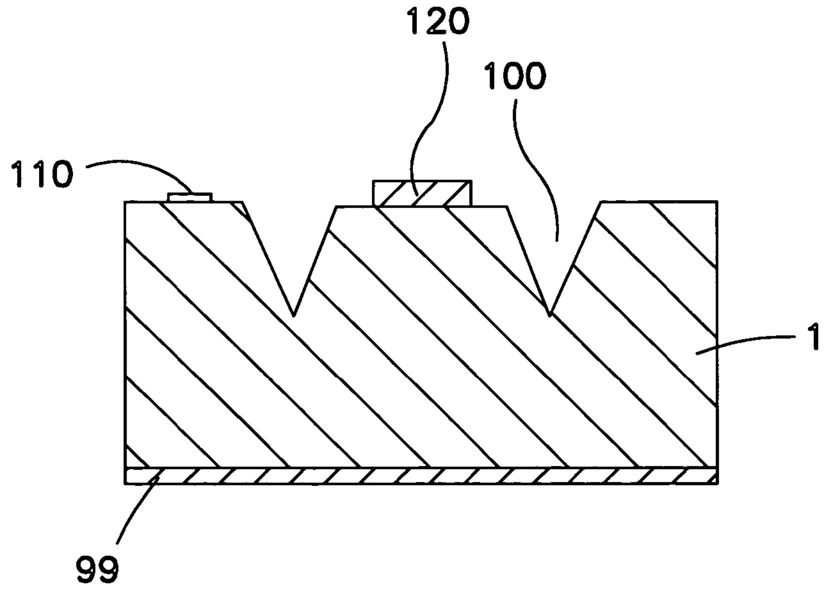

Next, heaters 110 were formed in two lines, each line of the heaters 110 being on the outward side of the corresponding groove 100, as shown in FIGS. 10A and 10B. Further, a sacrificial layer 120 was formed in the form of a rectangle which extends between the two groves 100, in the direction of the two grooves 100, a predetermined distance beyond the lines of the heaters 110. The sacrificial layer 120 is formed of a substance dissolvable when creating the ink supply hole 109 (see FIG. 17) by etching. In this embodiment, polysilicon (polycrystalline silicon) was used as the material for the sacrificial layer 120, and the polysilicon film was formed as the sacrificial layer 120 across a predetermined area, in the predetermined pattern, with the use of one of the photolithographic technologies. The thickness of the sacrificial layer 120 was 3,000 Å.

Figure 11A:
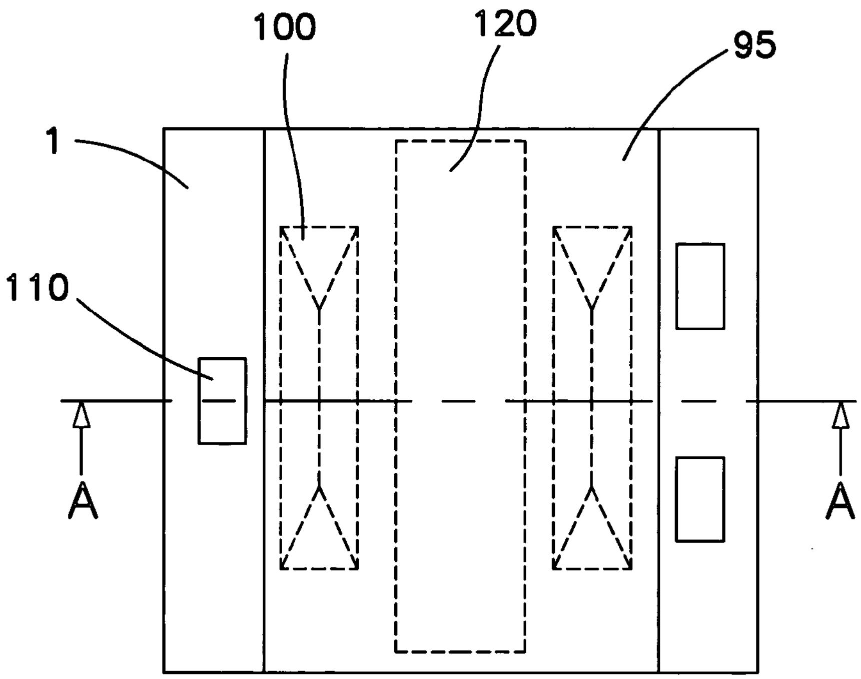
FIGS. 11A and 11B are schematic drawings of the ink jet recording head in the sixth embodiment of the present invention, showing the ink jet recording head manufacturing step immediately subsequent to the step shown in FIGS. 10A and 10B.
Figure 11B:
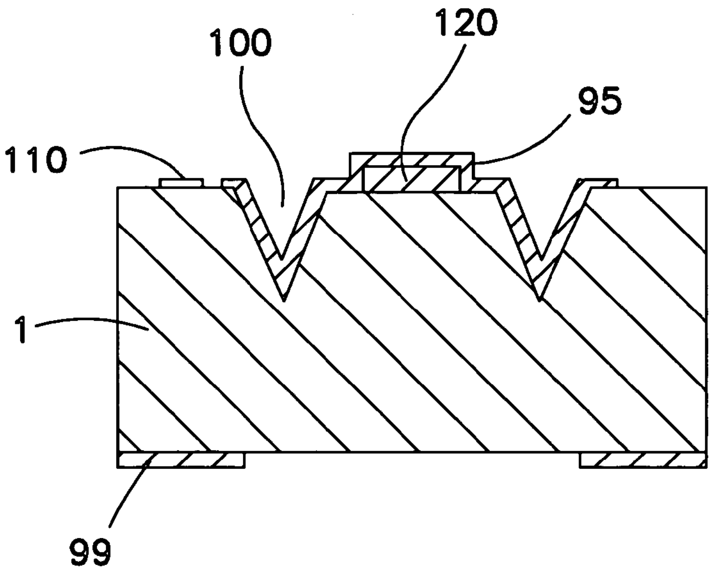

Next, a SiOx film is formed on the surface of the substrate 1 on the obverse side, and then, a protective film (passivation film) 95 is formed by patterning as shown in FIGS. 11A and 11B. The protective film 95 covered the internal surfaces of each groove 100, and the top and lateral surfaces of the sacrificial layer 120. Further, the SiNx film formed on the surface of the substrate 1 on the reverse side, that is, the reverse surface etching mask layer 99, was given, by patterning, a hole with a predetermined size, which directly opposes the sacrificial layer 120 across the substrate 1.

Figure 12A:
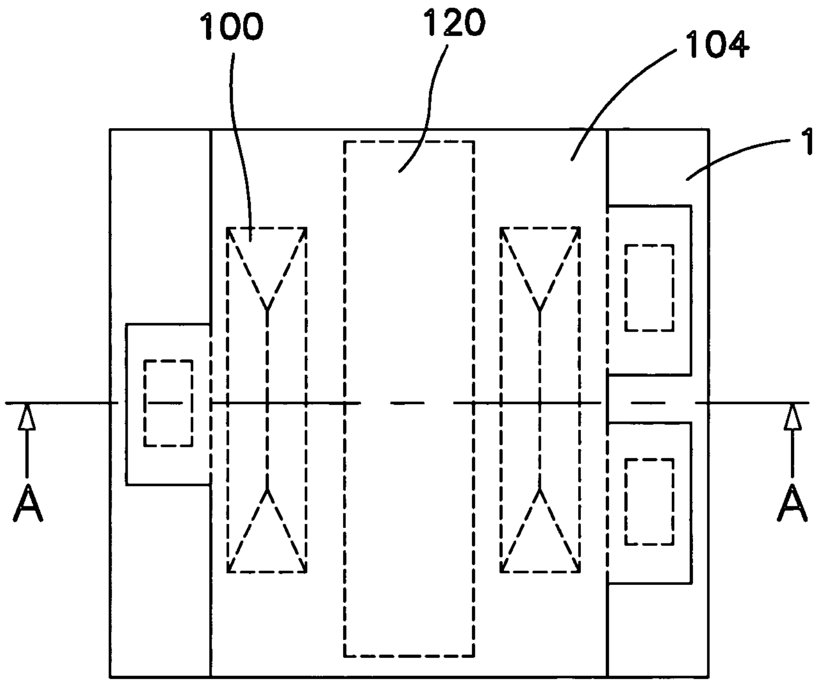
FIGS. 12A and 12B are schematic drawings of the ink jet recording head in the sixth embodiment of the present invention, showing the ink jet recording head manufacturing step immediately subsequent to the step shown in FIGS. 11A and 11B.
Figure 12B:
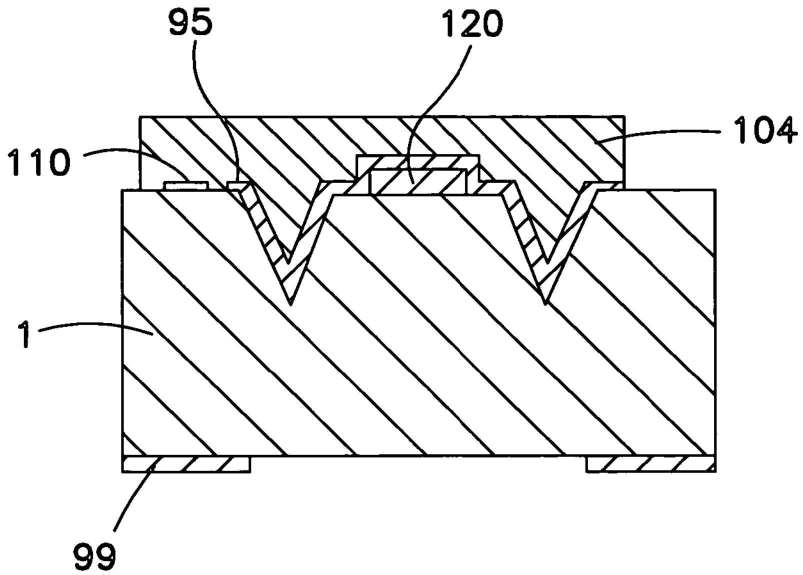

Next, in order to form the nozzles, an ink passage formation layer 104 was formed as shown in FIGS. 12A and 12B, which would be removed by etching in one of the subsequent steps to create the ink passages 107 (FIG. 17). The ink passage formation layer 104 comprised a center portion which covered the sacrificial layer 120 and the pair of grooves 100, and a plurality of appendages which extend from the center portion over the heaters 110, one for one, with the presence of a predetermined interval between adjacent appendages. The interval portions of the ink formation layer 104, between the adjacent appendages of the ink passage formation layer 104 extending from the center portion over the heaters 110, one for one, were eventually turned into the ink passage walls between adjacent ink passages 107. Incidentally, if a resin is used as the material for the ink passage formation layer 104, the depth and opening size of each groove 100 to be formed in the obverse surface of the substrate 1 can be adjusted to reduce the effect of the presence of the groove 100 upon the thickness of the ink passage formation layer 104, in order to improve the distribution of the thickness in which the ink passage formation layer 104 is formed.

Figure 13A:
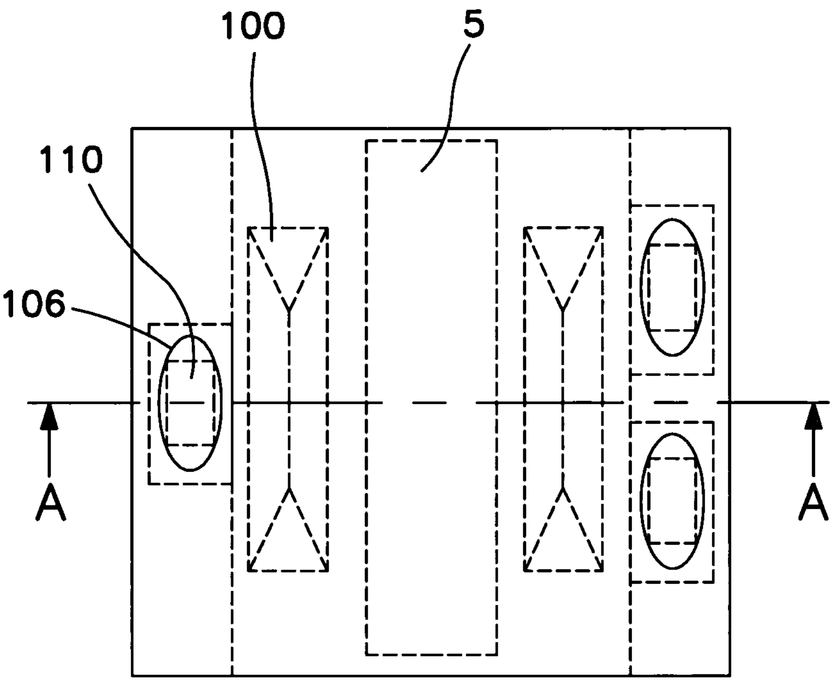
FIGS. 13A and 13B are schematic drawings of the ink jet recording head in the sixth embodiment of the present invention, showing the ink jet recording head manufacturing step immediately subsequent to the step shown in FIGS. 12A and 12B.
Figure 13B:
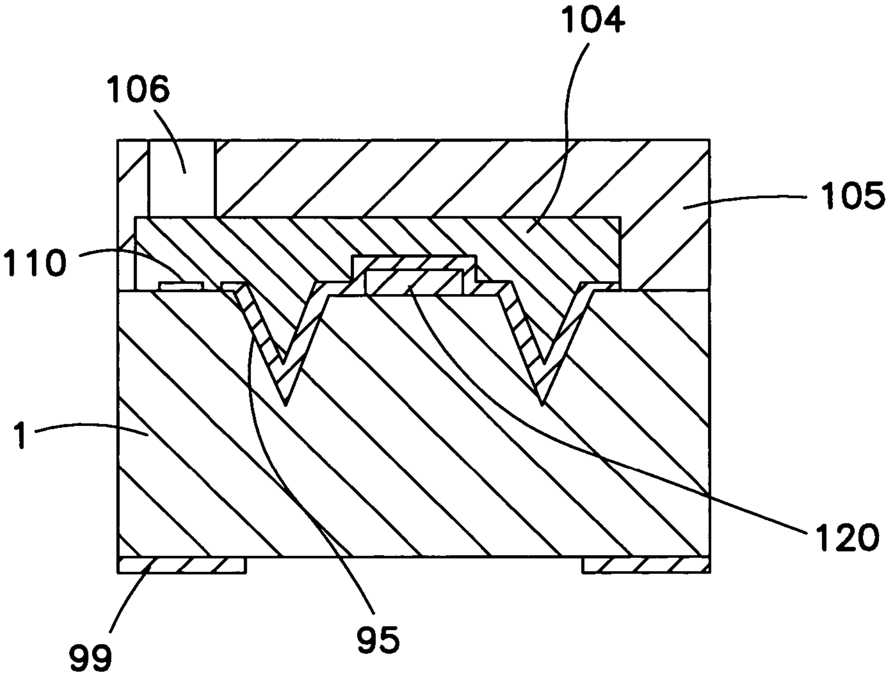

Next, a nozzle formation layer 105 was formed on the liquid passage formation layer 104 as shown in FIGS. 13A and 13B. Then, the orifices 106 were made through the nozzle formation layer 105, in alignment with the heaters 110, one for one. Incidentally, the orifices 106 can be formed with the use of one of the photolithographic technologies, or the like.

Figure 14A:
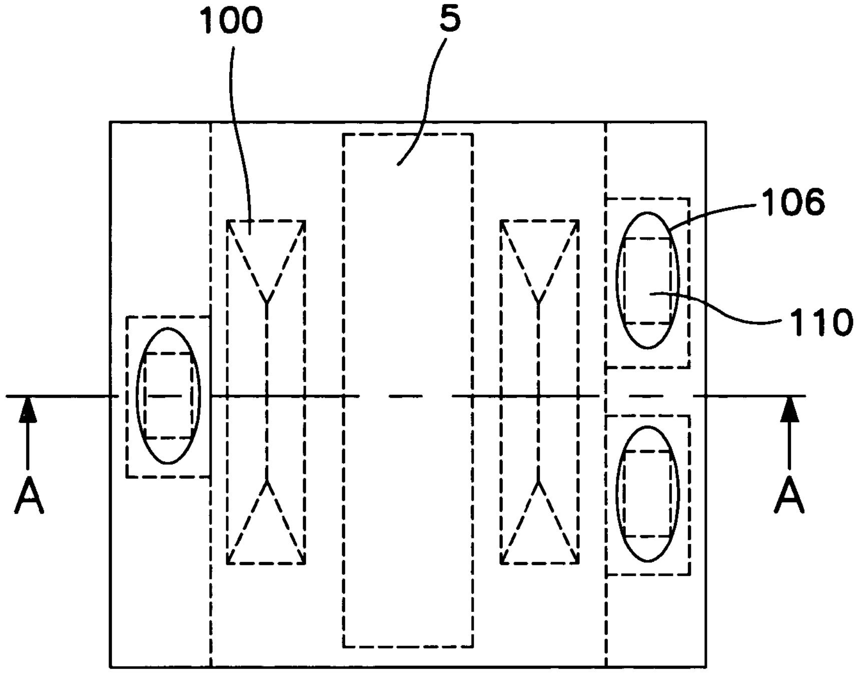
FIGS. 14A and 14B are schematic drawings of the ink jet recording head in the sixth embodiment of the present invention, showing the ink jet recording head manufacturing step immediately subsequent to the step shown in FIGS. 13A and 13B.
Figure 14B:
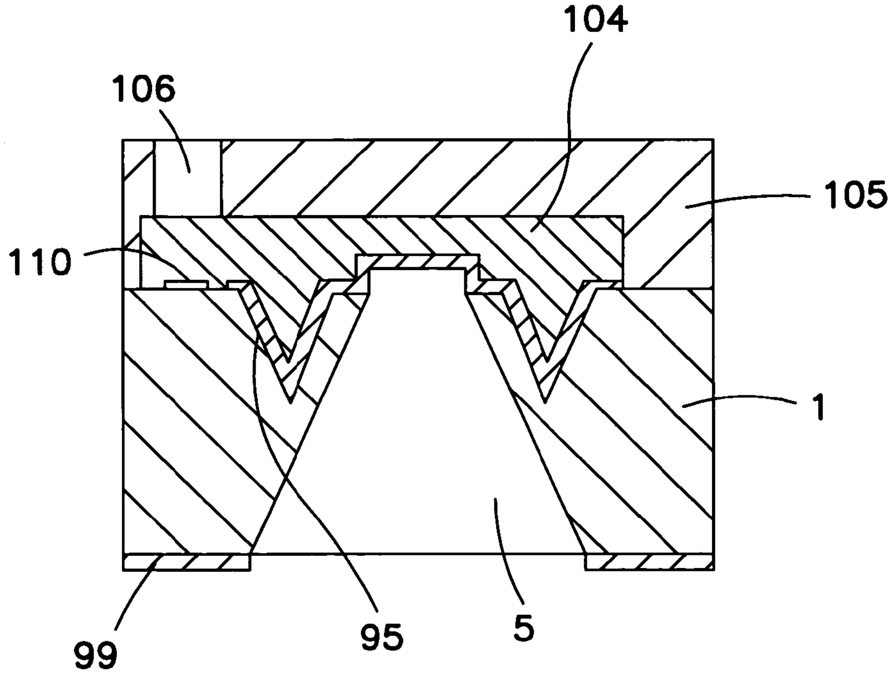

Next, the substrate 1 was etched from the reverse side by an anisotropic etching method with the reverse surface etching mask layer 99 used as a mask, effecting thereby the groove 5 in the reverse side of the substrate 1 as shown in FIGS. 14A and 14B. Incidentally, it is desired that, when forming the groove 5 by etching the substrate 1 from the reverse side with the use of the anisotropic etching method, the obverse and lateral sides of the substrate 1 be covered with a resinous substance such as a cyclized rubber or the like, in order to protect the nozzle formation layer 105. As the etching liquid, TMAH was used at a concentration of 22% and a temperature of 83° C. The sacrificial layer 120 was easily etched through this etching process, whereas the protective layer 95 formed of SiO was resistant to this etching process, and was not etched, remaining thereby intact.

In this embodiment, the area of the SiOx film layer on the reverse surface of the substrate 1 which was to be removed to form the opening of the reverse surface etching mask layer 99, and the area of the obverse surface of the substrate 1 on which the sacrificial layer 120 was to be formed, were adjusted in position so that the opening of the groove 5, on the obverse side of the substrate 1, coincided with the bottom surface of the sacrificial layer 120, or was within the range of the sacrificial layer 120, as shown in FIGS. 14A and 14B, when forming the groove 5 by etching the substrate 1 from the reverse side.

Figure 15A:
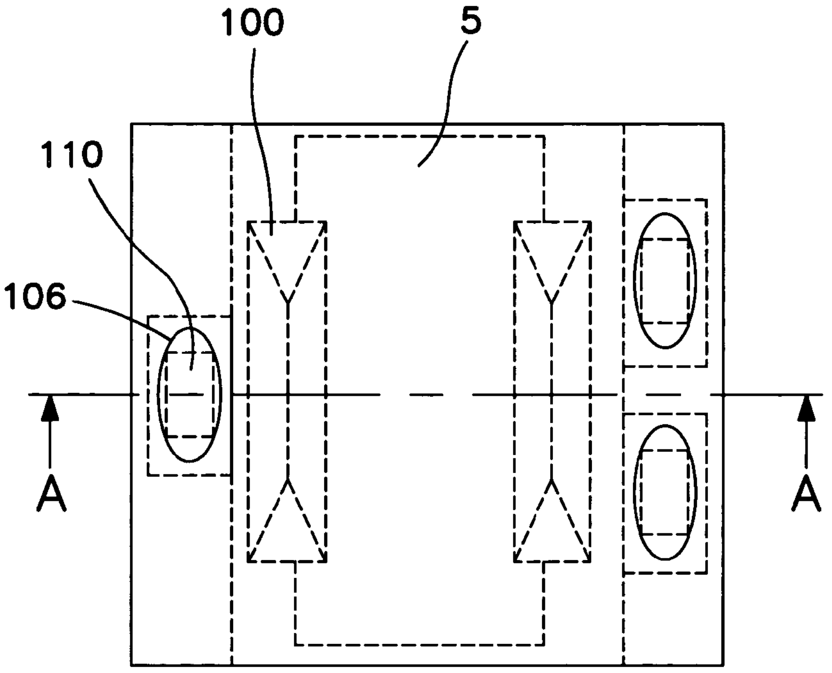
FIGS. 15A and 15B are schematic drawings of the ink jet recording head in the sixth embodiment of the present invention, showing the ink jet recording head manufacturing step immediately subsequent to the step shown in FIGS. 14A and 14B.
Figure 15B:
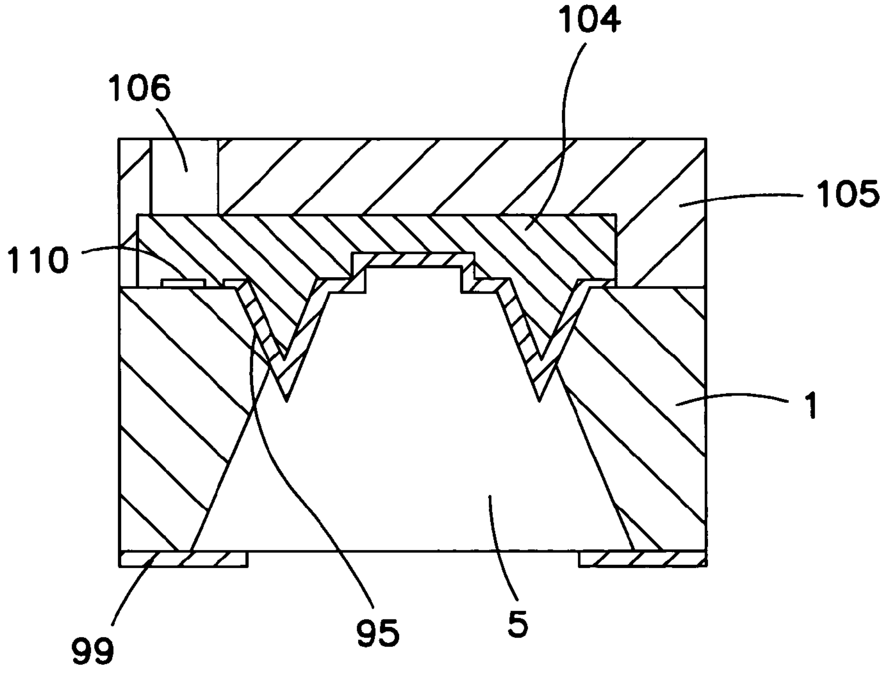

Next, the anisotropic etching process was continued to grow the groove 5 deeper and wider until the groove 5 reached the wall of each of the grooves 100 as shown in FIGS. 15A and 15B. In other words, the protective layer 95 was exposed from the reverse side of the substrate 1, across the areas corresponding to the inward wall of each groove 100 and the area corresponding to the sacrificial layer 120.

Next, as shown in FIGS. 16A and 16B, the protective layer 95, that is, the film of SiOx, was etched away, across the area exposed from the reverse side of the substrate 1, with the use of buffered hydrofluoric acid. Lastly, the ink passage layer 104 was dissolved away, as shown in FIGS. 17A and 17B. If the obverse and lateral sides of the substrate 1 were covered with a resinous substance such as a cyclized rubber or the like in order to protect the nozzle formation layer 105, as described above, this resinous substance is desired to be removed prior to the dissolving of the nozzle formation layer 105 in order to successfully and effectively remove the ink passage formation layer 104.

With the removal of the ink passage formation layer 104 in the final step, the grooves 100 which had been formed from the obverse side of the substrate 1 become fully connected to the groove 5 which had been formed from the reverse side of the substrate 1, effecting thereby the ink supply hole 109, as well as the ink passages 107 which extend to the ejection orifices 106, one for one, from the ink supply hole 109. With the removal of the protective layer 95 across the above described area, and the removal of the ink passage formation layer 104, the two grooves 100, whose side surfaces were inclined and which had been formed by anisotropic etching, were destroyed, leaving only the portions of the protective layer 95 corresponding, one for one, to the outward surfaces of the two grooves 100. As a result, ridges were formed by the remaining portions of the protective layer 104, which was slanted, and the surface of the ink supply hole 109, which also was slanted. Thus, the area of the hole, on the obverse side of the ridge, is covered with the protective film 95.

According to the above described ink jet recording head manufacturing method in this embodiment, the position of the edges of the ink supply hole 109, on the obverse side of the substrate 1, is determined by the position of the outward edges of the two grooves 100 formed from the obverse side of the substrate 1. Further, the two grooves 100 are formed from the obverse side of the substrate 1, that is, the same side of the substrate 1 as the surface of the substrate 1 on which the heaters 110 are formed. Therefore, the grooves 100 can be accurately positioned relative to the heaters 10. Therefore, the ink supply hole 109 can be accurately positioned, with ease, relative to the heaters 110. In addition, the obverse surface of the substrate 1 is where the semiconductor circuit is formed. Therefore, it has only a very small number of crystalline defects. Therefore, the grooves 100 in this embodiment formed in this surface were highly accurate in position and dimension, because the smaller the number of crystalline defects on a given surface, the higher the level of accuracy at which the grooves 100 can be easily formed in the given surface. As will be evident from the above description, according to the ink jet recording head manufacturing method in this embodiment, the grooves 100 can be formed so that their edges, in other words, the edges of the opening of the ink supply hole 109, on the obverse side of the substrate 1, will be very accurately positioned relative to the substrate 1. Therefore, the distance L1 (FIGS. 17B and 18), between the edge of the ink supply hole 109 and the center of a given heater 110, becomes very accurate.

Incidentally, when forming a through hole in a substrate from the reverse side thereof with the use of an anisotropic etching method as in this embodiment, the size of the opening of the through hole, on the obverse side of the substrate, sometimes becomes different from the predetermined one due to the crystalline defects of the substrate, deviation in the substrate thickness and orientation flat angle, deviation in the etching liquid concentration, high temperature process in some of the semiconductor manufacturing steps, etc. If the deviation in the size of the opening of the through hole created as the ink supply hole, on the obverse side of the substrate, happens to be in the direction perpendicular to the direction in which nozzles extend, the distance between the through hole, that is, the ink supply hole, and each of the ejection pressure generation elements (which hereinafter will be referred to as CH distance) is different from a predetermined one, which makes the plurality of ejection nozzles nonuniform in one of their characteristics, that is, the refilling of the nozzles with ink, more specifically, the delivery of ink to an ejection energy generation element. The nonuniformity in the refilling of an ink ejection nozzle with ink, such as described above, significantly affects the operational characteristics, in particular, the operational frequency, of an ink jet recording head. More specifically, the longer the CH distance of a nozzle, the slower the refilling of the nozzle, being therefore lower in the operational frequency, that is, the frequency at which a nozzle is refilled with ink for the next ejection. Therefore, the operational frequency of an ink jet recording head must be adjusted to the frequency at which a nozzle which is greater in CH distance, and therefore, lower in operational frequency, can successfully operate; in other words, it must be restricted to a relatively lower frequency.

In comparison, in the case of the ink jet recording head manufacturing method in this embodiment, when the groove 5 is formed from the reverse side of the substrate 1 by etching as described above with reference to FIG. 14, the edge of the opening of the groove 5, on the obverse side of the substrate 1, falls within the range of the sacrificial layer 120. More specifically, the edge of the opening of the groove 5, on the obverse side of the substrate 1, which grows with the progress of the etching, coincides with the borderline between the area of the substrate 1, on the obverse side of the substrate 1, across which the sacrificial layer 120 (easily dissolvable by etching) was formed and the area of the substrate 1 across which the corrosion resistant protective film 95 was formed. In other words, according to this manufacturing method, even if the size and/or position of the opening of the groove 5, on the obverse side of the substrate 1, becomes slightly different from the predetermined size and/or position due to a deviation, in the speed at which the substrate 1 is etched during the formation of the groove 5, from a predetermined one, the edge of this opening temporarily coincides in position with the borderline between the sacrificial layer 120 and the protective layer 95, as the opening grows. In other words, the sacrificial layer 120 functions to suppress, more specifically, to compensate for, the effects of deviation in the etching speed, thereby preventing the problems that the contour of the portion of the substrate 1 being etched for the formation of the groove 5 deviates from a straight line, or that the ink jet head manufacturing operation becomes inconsistent in the location at which the edge of the through hole being etched for the formation of the groove 5 will be located after a given length of time from the beginning of the etching process, during the ink jet recording manufacturing process.

The growth of the groove 5 connects the groove 5 to the grooves 100 in the last stage of this step. During this step, the groove 5 becomes connected to the grooves 100 virtually at the same time across the entirety of its edges, because the effects of the fluctuation in the etching speed are suppressed by the sacrificial layer 120, as described above. Each of the internal surfaces of the ink supply hole 109 effected by the merger between the groove 5 and grooves 100, parallel to the lines of the heaters 110, is slanted so that the distance between the two internal surfaces of the ink supply hole 109 is smallest between the ridge between the groove 5 and one of the grooves 100, and the ridge between the groove 5 and the other groove 100. The area on the obverse surface side of each of these ridges is covered with the protective layer 95. Therefore, unlike when an ink jet recording head is manufactured with the use of one of the ink jet recording head manufacturing methods in accordance with the prior art, the problem that the ink supply hole 109 is not formed to match a predetermined specification because the adjacencies of the ridge between the groove 5 and grooves 100 are etched at a higher rate than the other portions, does not occur. As will be evident from the above description, the ink jet recording head manufacturing method in this embodiment makes it possible to highly precisely form the ridge portions between the groove 5 and grooves 100 of an ink jet recording head, which are effected by the merger between the groove 5 and grooves 100. In other words, the distance L2 (FIGS. 17B and 18) from this ridge to the center of a given heater 110 becomes highly accurate, minimizing the difference among the nozzles in terms of the distance L2.

As described above, the ink jet recording head manufacturing method in this embodiment makes it possible to highly precisely form the ink supply passages which extend to the ink passages 107, one for one, from the ink supply hole 109, to a predetermined specification, minimizing thereby the difference among the nozzles, in other words, making the nozzles uniform in terms of the conductance of the liquid supply passage from the ink supply hole 109 to a nozzle, which in turn makes it possible to eject ink at a higher frequency, making it therefore possible to record at a higher speed. In other words, the ink jet recording head manufacturing method in this embodiment can manufacture an ink jet recording head capable of recording at a higher speed. In fact, in the case of the ink jet recording heads manufactured through the trial runs of the manufacturing method in this embodiment, ink could be satisfactorily ejected through all the nozzles at an ejection frequency of 25 kHz; thus, the upper limit of the ejection frequency was higher than 25 kHz.

Further, in the case of the ink jet recording head manufacturing method in this embodiment, the area of the ink supply passage on the obverse side of the ridge effected between the groove 5 formed from the reverse side of the substrate 1 and the grooves 100 formed from the obverse side of the substrate 1, as the groove 5 merges with the grooves 100, is covered with the protective layer 95, being therefore less likely to be corroded by ink, compared to the area on the obverse side of the ridge of an ink jet recording head manufactured with the use of one of the ink jet recording head manufacturing methods in accordance with the prior art. Further, in the case of the manufacturing method in this embodiment, the groove 5 is formed by anisotropic etching. Therefore, the surfaces of the groove 5 have a crystal orientation index of <111>, being therefore highly resistant to alkaline substances. In addition, the ink supply passages of the ink jet recording head manufactured by the manufacturing method in this embodiment are highly corrosion resistant to ink. Therefore, even if a corrosive ink, for example, alkaline ink, is used, virtually no silicon dissolves into the ink. In fact, when the ink left for a predetermined length of time in the ink jet recording heads manufactured through the trial runs of the manufacturing method in this embodiment was analyzed, silicon and the like could not be detected at a significant level; they had not dissolved into the ink by a significant amount.

Further, in the case of the ink jet recording head in this embodiment, the internal surface of each of the grooves 100 formed from the obverse side of the substrate 1 is entirely covered with the protective film 95 after the formation of the grooves 100. Therefore, even if the grooves 100 are formed by isotropic wet etching, or anisotropic or isotropic dry etching, the grooves 100 are highly corrosion resistant to ink. Further, the protective film 95 can be given such a function as to protect the semiconductor circuit and the like formed on the obverse surface of the substrate 1.

Further, in this embodiment, the protective film 95 is formed on the obverse side of the substrate 1 prior to the formation of the groove 5 by etching the substrate 1 from the reverse side of the substrate 1. Therefore, when the groove 5 is formed, the etching liquid does not come into contact with the obverse surface of the substrate 1, on which the semiconductor circuit is present; in other words, the anisotropic etching for forming the groove 5 can be carried out without adversely affecting the semiconductor circuit and the like. Further, the above described ink jet recording head manufacturing method in this embodiment is much smaller in the amount of the debris generated during the formation of the ink supply hole, compared to the ink jet head manufacturing methods in which ink supply hole is formed by sand blasting, laser processing, or the like. In fact, in the durability tests to which the ink jet recording heads manufactured through the trial runs of the ink jet recording head manufacturing method in this embodiment were subjected, ink was reliably ejected, that is, the problem that the ink jet recording head is plugged up by debris, or the like problems, did not occur, even though the ink was ejected $10^9$ times.

As described above, according to this embodiment an ink jet recording head can be manufactured which is highly resistant to the corrosiveness of ink, and whose nozzles are uniform in ink refill properties. In other words, according to this embodiment an ink jet recording head can be manufactured in which ink is reliably supplied to all nozzles in a predetermined precise amount.

Incidentally, in this embodiment, a piece of silicon wafer the crystal orientation index of the surface of which was <100> was used as the substrate 1. However, a piece of silicon wafer the crystal orientation index of the surface of which is <110> may be used as the substrate 1. In the case of the latter, a groove having internal surfaces with a crystal orientation index of <111>, that is, internal surfaces highly resistant to the corrosiveness of ink, can be formed from the reverse side of the substrate 1 by anisotropic etching. The formation of the groove 5 from the reverse side of the substrate 1 may be carried out by one of the wet etching methods which is not anisotropic. Also in this case, the ridge can be highly precisely formed to match a predetermined shape and dimension, between the grooves 100 formed from the obverse side of the substrate 1 and the groove 5 formed from the reverse side of the substrate 1.

Also in this embodiment, the grooves 100 were formed from the obverse side of the substrate 1 by the anisotropic etching. However, the grooves 100 may be formed by isotropic wet etching, isotropic dry etching, or anisotropic dry etching. In any case, the protective film 95 should be formed to cover the internal surfaces of the grooves as described above, so that the grooves 100 become highly resistant to the corrosiveness of ink.

Also in this embodiment, a SiNx film was formed as the reverse surface etching mask layer 99. However, a SiOx film may be formed. As for the sacrificial layer 120, a polycrystalline silicon film was formed. However, a film, other than the polycrystalline silicon film, that can be easily dissolved by a wet etching process for forming the groove 5, may be formed. For example, the sacrificial layer 120 may be formed of aluminum.

Also in this embodiment, a SiOx film is formed as the protective film 95. A film, other than the SiOx film, that is resistant to the corrosiveness of highly alkaline chemicals, in particular, KOH and TMAH, which are used for anisotropic etching, may be used. More concretely, instead of the SiOx film, a SiNx film may be formed as the protective film 95. Further, both a SiOx film and a SiNx film may be formed. Further, a film formed of polyether-amide, or the like, can be used as the protective film 95.

Embodiment 7

Next, referring to FIGS. 19A-28, the ink jet recording head manufacturing method in the seventh embodiment of the present invention will be described. FIGS. 19A–27B are schematic drawings of the ink jet recording head in this embodiment, showing the ink jet recording heads after the completion of the manufacturing steps, one for one, in the order in which the steps are carried out. In the drawings, the figure designated as “A” is a plan view of the ink jet recording head in this embodiment, and the figure designated as “B” is a vertical sectional view thereof at the line A—A in the plan view “A”. FIG. 28 is a plan view of the completed ink jet recording head shown in FIGS. 27A and 27B. In FIG. 28, the nozzle layer is not shown. In these drawings, the portions of the ink jet recording head similar to those in the first embodiment are given the same referential symbols as those given in the sixth embodiment. Also in these drawings, in order to make the drawings easier to understand, only three nozzles are shown; the semiconductor circuit, inclusive of transistors and the like for driving the heaters, formed on the substrate 1, and the pads formed, as electrodes for electrically connecting the recording head with the main assembly of a recording apparatus, on the substrate 1, are not shown in the drawings, as they were not in the drawings pertaining to the sixth embodiment.

Figure 27A:
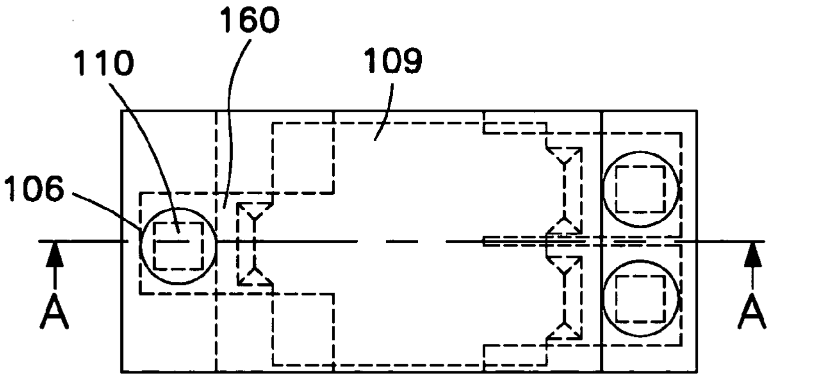
FIGS. 27A and 27B are schematic drawings of the ink jet recording head in the seventh embodiment of the present invention, showing the ink jet recording head manufacturing step immediately subsequent to the step shown in FIGS. 26A and 26B.
Figure 27B:
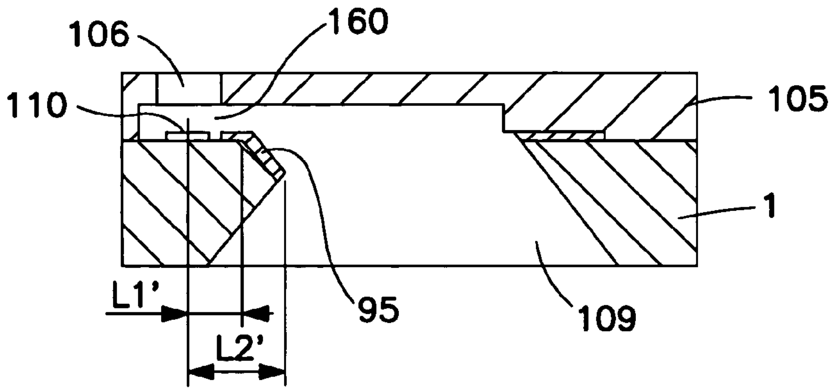
Figure 28:
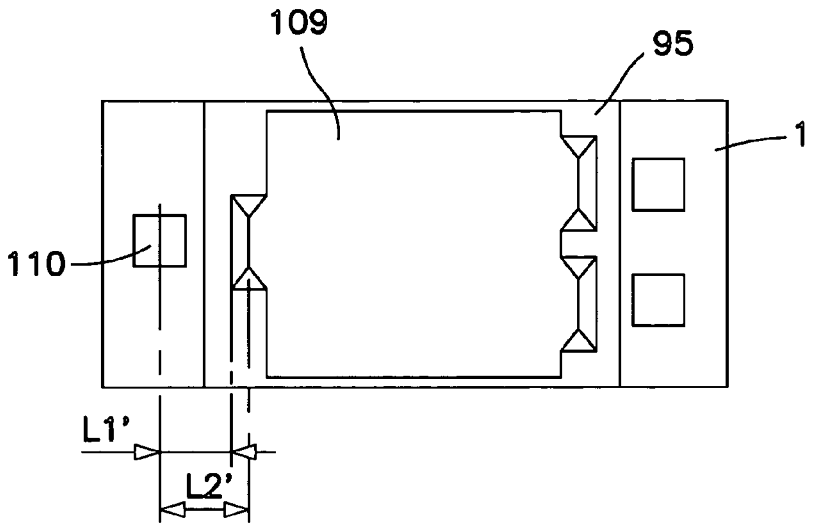
FIG. 28 is a schematic plan view of the ink jet recording head in the seventh embodiment of the present invention which has been completed through the steps shown in FIGS. 19A–27B, without showing the nozzle layer.
Figure 29A:
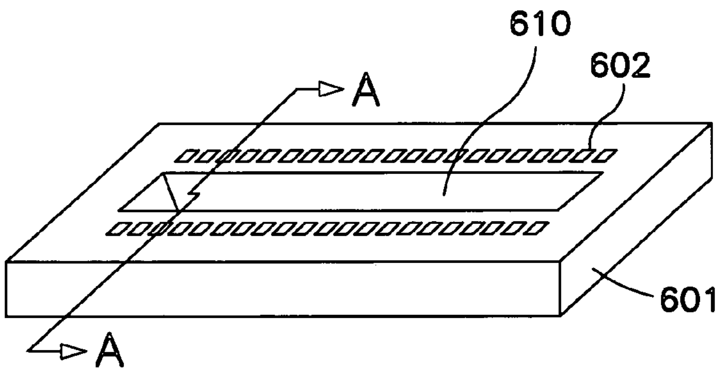
FIGS. 29A and 29B are schematic drawings of one of the ink jet recording heads in accordance with the prior art.
Figure 29B:
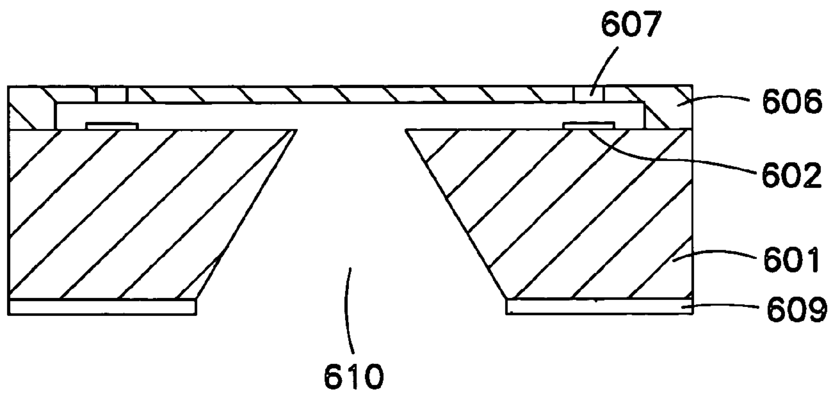

Referring to FIGS. 27A and 27B, the ink jet recording head manufactured with the use of the ink jet recording head manufacturing method in this embodiment has a substrate 1 provided with an ink supply hole 109, which is a through hole, and a plurality of heaters 110 disposed in two lines along the top edges of the ink supply hole 109, one line for each edge. There is also on the substrate 1, a nozzle formation layer 105 having a plurality of the nozzles, each of which has an ejection orifice 106 positioned directly above a heater, and an ink passage 160 leading from the ink supply hole 109 to the ejection orifice 106. In the case of the ink jet recording head in this embodiment, each ink passage 160 is shaped so that the portion of its bottom surface, on the ink supply hole 109 side, is slanted downward; in other words, the portion of the bottom surface of the ink passage 160, on the ink supply hole 109 side, is sloped downward toward the ink supply hole 109; in other words, it has a recessed portion.

Incidentally, in recent years, technologies for outputting high quality images by reducing the size in which ink droplets are ejected have been developed in the field of ink jet recording heads. As the methods for reducing the size in which ink droplets are ejected, reducing the size of an ejection orifice, and shortening the OH distance, can be listed. However, reducing the ejection orifice size creates the problem that the ejection orifice is likely to be plugged with debris. In order to prevent this problem, it is necessary to extremely carefully clean not only the head components, but also the areas in which the heads are manufactured, which substantially increases head cost. Thus, from the standpoint of head manufacturing efficiency, it is desired that the size (diameter) in which ink droplets are ejected is reduced by shortening the OH distance, without substantially reducing the ejection orifice size, or while leaving the ejection orifice size as is. With the employment of this measure, it is possible not only to make it less likely for ejection orifices to be plugged up by debris, but also to reduce the flow resistance in the ink passage extending from the heater to the corresponding ejection orifice, thereby reducing the amount of pressure required to eject ink, which in turn makes it possible to reduce the heater capacity. With the reduction of the heater capacity, the head temperature remains lower, thereby reducing the amount by which water in the ink evaporates. Therefore, it is possible to prevent the phenomenon that, while a given ejection orifice is inactive, the ink in the adjacencies of that orifice increases in viscosity, due to the evaporation of the water in the ink, thereby becoming harder to eject.

However, if the OH distance of an ink jet recording head such as those of the preceding embodiments, in which the ejection orifices 106 are disposed directly opposite to the heaters 10, one for one, is simply reduced, the ink passages 160 become smaller in vertical dimension, thereby reducing the speed at which the nozzles are refilled with ink. This definitely lowers the upper limit of the operational frequency of the ink jet recording head.

In comparison, in the case of the ink jet recording head in this embodiment, manufactured with the use of the ink jet recording head manufacturing method in this embodiment, each ink passage 160 is shaped so that the portion of its bottom surface, on the ink supply hole 109 side, is tilted downward toward the ink supply hole 109, thereby reducing the flow resistance in the ink passage 160. Thus, even if the OH distance is reduced, the above described refill speed is not adversely affected, and therefore the upper limit of the operational frequency of the recording head remains unaffected; it remains at a higher level. Also in the case of this structural arrangement, the flow resistance in the ink passage 160 has been reduced without reducing the length of the ink passage 160, making less likely the occurrence of so-called cross-talk, that is, the phenomenon that the pressure generated in a given nozzle by a heater 110 for ink ejection adversely affects the ink ejection from other nozzles, by vibrating the ink in the other nozzles.

Next, the ink jet recording head manufacturing steps in this embodiment will be described in the order in which they are carried out.

Figure 19A:
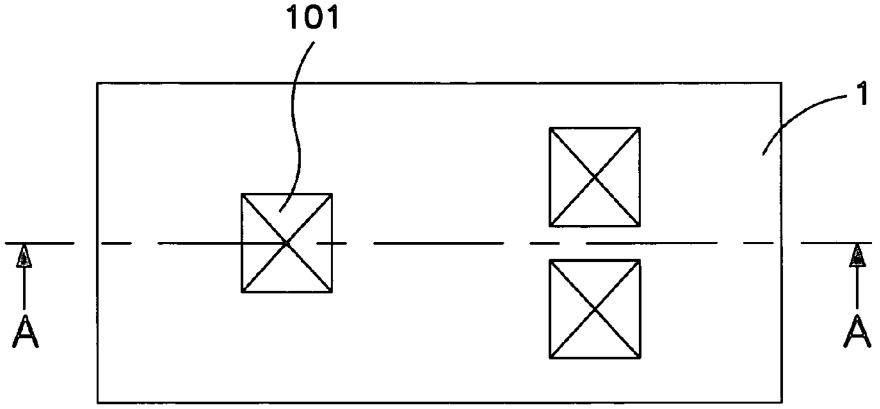
FIGS. 19A and 19B are schematic drawings of the ink jet recording head in the seventh embodiment of the present invention, showing one of the ink jet recording head manufacturing steps.
Figure 19B:
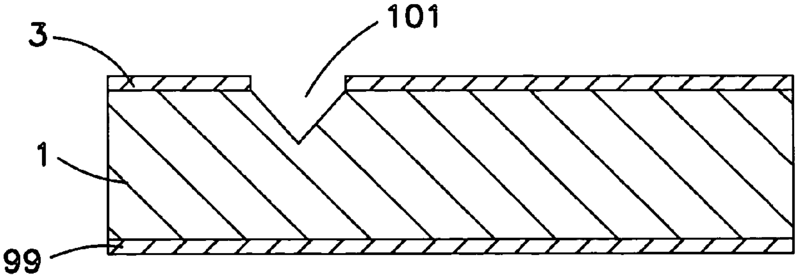

In this embodiment, a silicon wafer, the crystal orientation index of which is <100>, is used as the substrate 1. First, a SiNx film, which functions as the obverse surface etching mask layer 3 and reverse surface etching mask layer 99 shown in FIGS. 19A and 19B, is formed to a thickness of 100 nm on the obverse and reverse surfaces of the substrate 1, respectively. Then, a photo-resist layer is formed in a predetermined pattern on the SiNx film on the obverse surface of the substrate 1 with the use of a photolithographic process. Then, the SiNx film is etched by a reactive ion etching method which uses $CF_4$ gas, with this photo-resist layer used as a mask. Then, the photo-resist layer is peeled away, effecting thereby on the obverse surface of the substrate 1, the surface etching mask layer 3 having a predetermined pattern. In this embodiment, the surface etching mask layer 3 has a plurality of openings, as shown in FIG. 19A, which coincide in position with the bottom surfaces of the ink passages 160 (FIGS. 27A and 27B), which would be formed later.

Specifically, a plurality of short grooves 101 were formed in the obverse surface of the substrate 1 by anisotropic etching, with this surface etching mask layer 3 used as a mask. Thus, there was one groove 101 for every area of the obverse surface of the substrate 1 which corresponded in position to the bottom surface of an ink passage 160 which would be formed later. For this step of forming the plurality of grooves 101 by anisotropic etching, TMAH was used as the etching liquid, at a temperature of 83° C. and a concentration of 22%. The rate of etching was 0.68 μm/min.

Figure 20A:
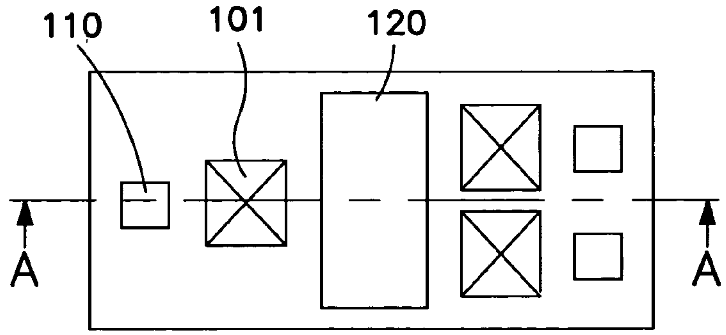
FIGS. 20A and 20B are schematic drawings of the ink jet recording head in the seventh embodiment of the present invention, showing the ink jet recording head manufacturing step immediately subsequent to the step shown in FIGS. 19A and 19B.
Figure 20B:
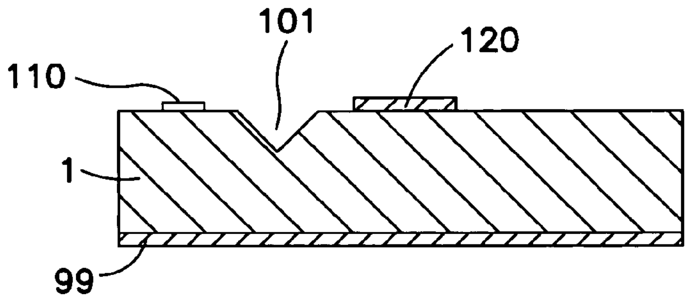

Next, as shown in FIGS. 20A and 20B, heaters 110 were formed on the obverse surface of the substrate 1, one for each groove 101, on the opposite side of the groove 101, with respect to the area which corresponds in position to an ink supply hole 109 (FIGS. 27A and 27B) which would be formed later. Then, a sacrificial layer 120 was formed on the obverse surface of the substrate 1, on the rectangular area between the two rows of grooves 101, which were on the inward side of the two strips in which two rows of nozzles would be formed one for one. The sacrificial layer 120 was formed so that it extended a predetermined distance beyond both lengthwise ends of the rows of the heaters 110. In this embodiment, a polysilicon film (polycrystalline silicon film) was used as the sacrificial layer 120; the sacrificial layer 120 was formed in a predetermined pattern on a predetermined area of the obverse surface of the substrate 1 using one of the photolithographic technologies. The thickness of the sacrificial layer 120 was 3,000 Å.

Figure 21A:
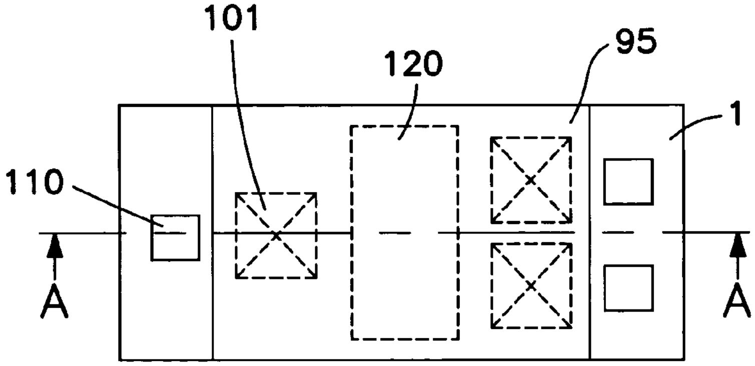
FIGS. 21A and 21B are schematic drawings of the ink jet recording head in the seventh embodiment of the present invention, showing the ink jet recording head manufacturing step immediately subsequent to the step shown in FIGS. 20A and 20B.
Figure 21B:
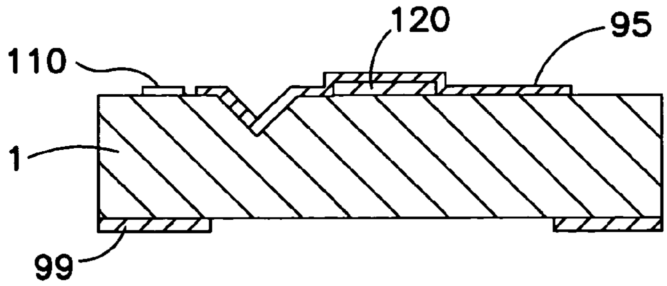

Next, a SiOx film was formed on the surface of the substrate 1 on the obverse side, and then, a protective film (passivation film) 95 was formed by patterning as shown in FIGS. 21A and 21B. The protective film 95 covered the internal surfaces of each groove 101, and the top and lateral surfaces of the sacrificial layer 120. Further, the SiNx film formed by deposition on the surface of the substrate 1, on the reverse side, was formed, by patterning, into a reverse surface etching mask 99 having a hole with a predetermined size, which directly opposed the sacrificial layer 120 across the substrate 1.

Figure 22A:
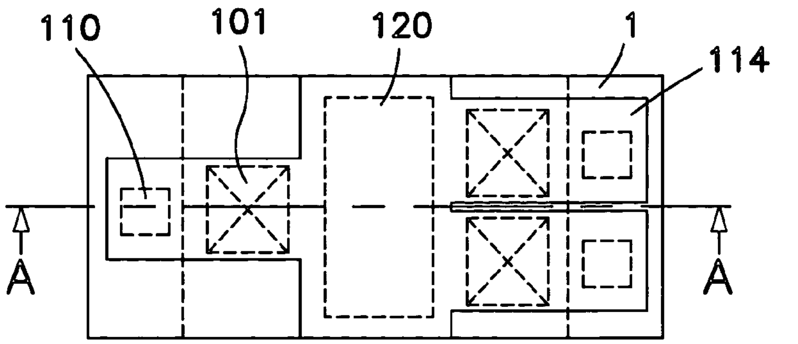
FIGS. 22A and 22B are schematic drawings of the ink jet recording head in the seventh embodiment of the present invention, showing the ink jet recording head manufacturing step immediately subsequent to the step shown in FIGS. 21A and 21B.
Figure 22B:
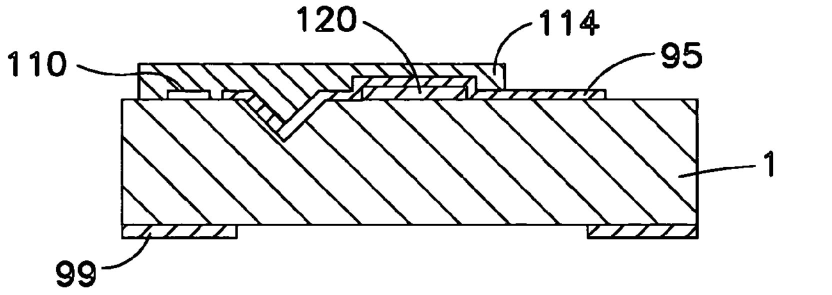

Next, in order to form the nozzles, an ink passages formation layer 114 was formed as shown in FIGS. 22A and 22B, which would be removed by etching in one of the subsequent steps, to create the ink passages 160 (FIGS. 27A and 27B). In this embodiment, the ink passage formation layer 114 comprised a center portion which covered the sacrificial layer 120 and a plurality of appendages which extended from the center portion over the heaters 110, one for one, with the presence of a predetermined interval between adjacent appendages. The base of each appendage was located closer to the center of the sacrificial layer 120 than the corresponding groove 101. In other words, each groove 101 was located between the theoretical walls of the corresponding ink passage 160, which would be formed later; it was so located so that it would become a part of the bottom surface of the ink passage 160. Incidentally, in this embodiment, the depth of each groove 101 was made the same as that of the groove 100 in the sixth embodiment. However, the size of the opening of the groove 101 was smaller than that of the groove 100. Therefore, when resin was coated to form the ink passage formation layer 114, it could be more easily and uniformly coated than when resin was coated to form the ink passage layer 104 in the sixth embodiment.

Figure 23A:
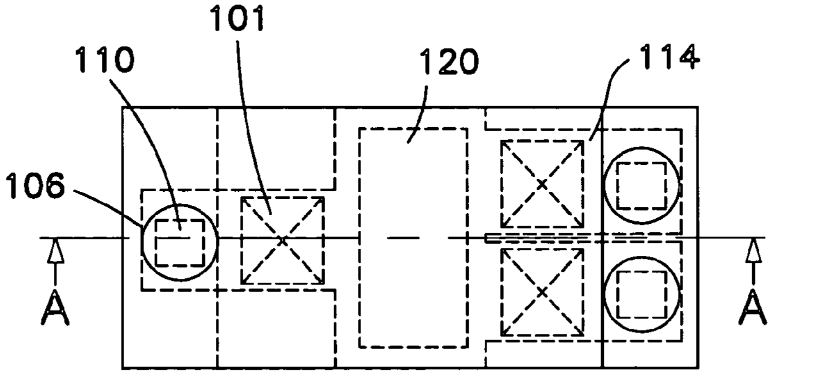
FIGS. 23A and 23B are schematic drawings of the ink jet recording head in the seventh embodiment of the present invention, showing the ink jet recording head manufacturing step immediately subsequent to the step shown in FIGS. 22A and 22B.
Figure 23B:
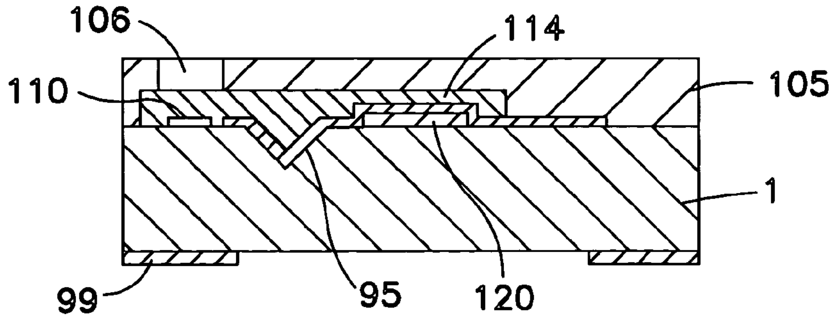

Next, a nozzle formation layer 105 was formed on the ink passage formation layer 114, as shown in FIGS. 23A and 23B. Then, the orifices 106 were made through the nozzle formation layer 105, in alignment with the heaters 110, one for one.

Next, the substrate 1 was etched from the reverse side by an anisotropic etching method with the reverse surface etching mask layer 99 used as a mask, effecting thereby the groove 5 in the reverse side of the substrate 1, as shown in FIG. 24. Incidentally, it is desired that, when forming the groove 5 by etching the substrate 1 from the reverse side with the use of the anisotropic etching method, the obverse and lateral sides of the substrate 1 be covered with a resinous substance such as cyclized rubber or the like, in order to protect the nozzle formation layer 105. As the etching liquid, TMAH was used at a concentration of 22% and a temperature of 83° C. The sacrificial layer 120 was easily dissolved away through this etching process, whereas the protective layer 95 formed of SiO was resistant to this etching process, and was not etched, remaining therefore intact.

Figure 24A:
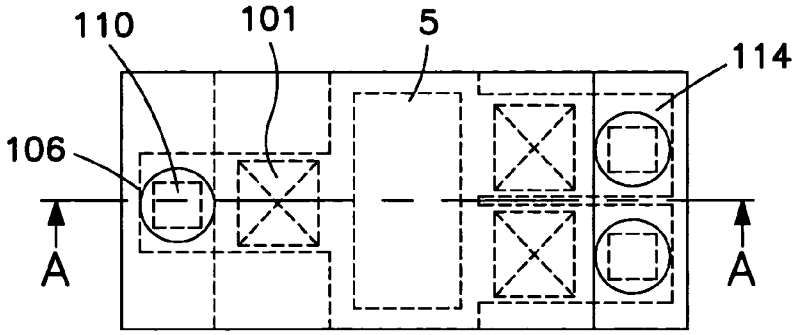
FIGS. 24A and 24B are schematic drawings of the ink jet recording head in the seventh embodiment of the present invention, showing the ink jet recording head manufacturing step immediately subsequent to the step shown in FIGS. 23A and 23B.
Figure 24B:
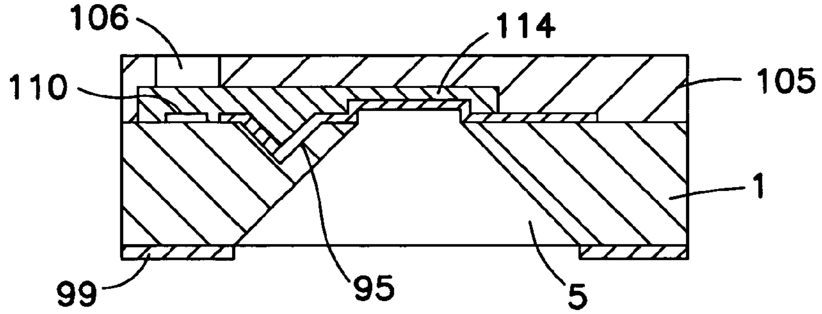

In this embodiment, an arrangement was made so that, when forming the groove 5 by etching the substrate 1 from the reverse side, the opening, on the obverse side of the substrate 1, of the groove 5 fell within the range of the sacrificial layer 120 as shown in FIGS. 24A and 24B.

Figure 25A:
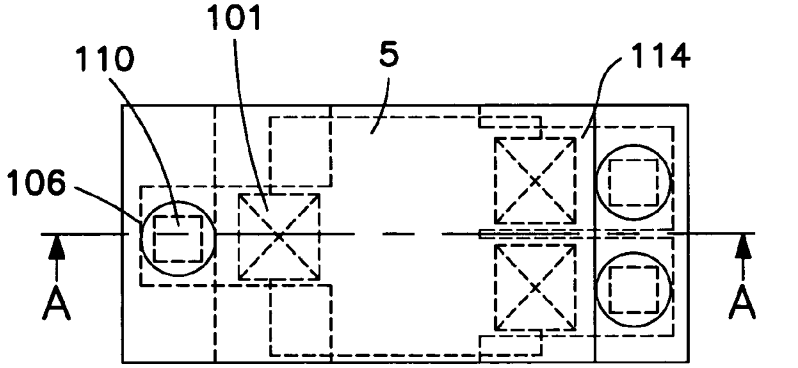
FIGS. 25A and 25B are schematic drawings of the ink jet recording head in the seventh embodiment of the present invention, showing the ink jet recording head manufacturing step immediately subsequent to the step shown in FIGS. 24A and 24B.
Figure 25B:
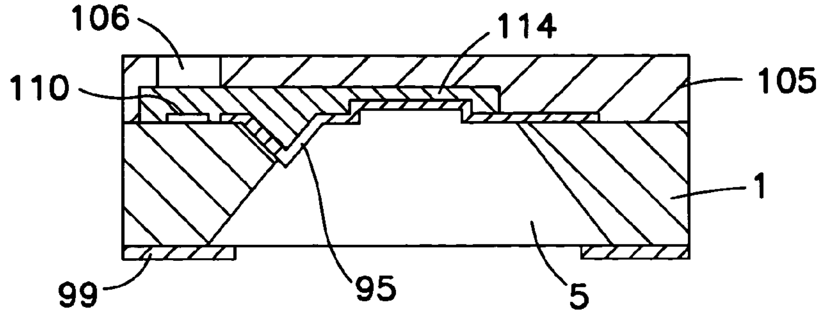

Next, the anisotropic etching process was continued to grow the groove 5 until the groove 5 reached each of the grooves 101 on the obverse side of the substrate 1, as shown in FIGS. 25A and 25B. More specifically, the groove 5 was grown until the protective layer 95 was exposed from the reverse side of the substrate 1 across the areas corresponding to the inward wall of each groove 101.

Figure 26A:
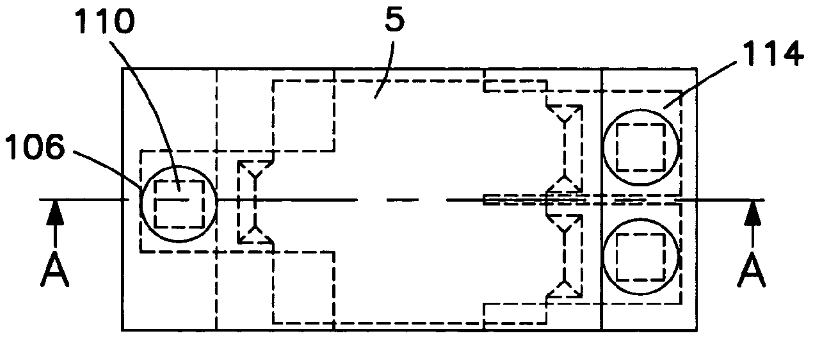
FIGS. 26A and 26B are schematic drawings of the ink jet recording head in the seventh embodiment of the present invention, showing the ink jet recording head manufacturing step immediately subsequent to the step shown in FIGS. 25A and 25B.
Figure 26B:
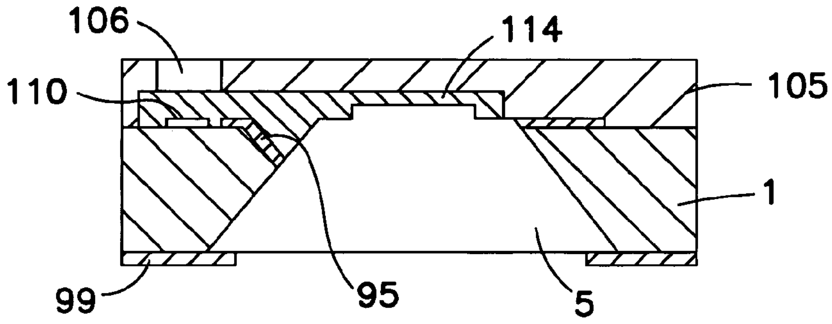

Next, from the reverse side of the substrate 1, the protective layer 95, that is, the film of SiOx, was etched away, as shown in FIGS. 26A and 26B, with the use of buffered hydrofluoric acid, across the area exposed from the reverse side of the substrate 1 due to the formation of the groove 5.

Lastly, the ink passage layer 114 was dissolved away, as shown in FIGS. 27A and 27B. If the obverse and lateral sides of the substrate 1 had been covered with a resinous substance such as cyclized rubber or the like in order to protect the nozzle formation layer 105 as described above, this resinous substance is desired to be removed prior to the dissolving of the nozzle formation layer 105, in order to successfully and effectively remove the ink passage formation layer 114.

With the removal of the ink passage formation layer 114 in the final step, the grooves 101 which had been formed from the obverse side of the substrate 1 merged with the groove 5 which had been formed from the reverse side of the substrate 1, effecting thereby the ink supply hole 109, as well as the ink passages 160, which extend to the ejection orifices 106, one for one, from the ink supply hole 109. After the removal of the protective layer 95 across the above described area and the removal of the ink passage formation layer 114, the outward wall of each groove 101 formed in the first step on the substrate 1, on the obverse side, still remained, making the portion of the bottom surface of each ink passage 160, next to the ink supply hole 109, slope downward toward the ink supply hole 109. As will be evident from the above description, this portion of the bottom surface of each ink passage 160 was covered with the protective film 95, and sloped downward to the opening of the ink supply hole 109, on the obverse side of the substrate 1. Thus, a ridge was formed between this portion of the bottom surface of each ink passage 160 and the surface of the ink supply hole 109.

According to the above described ink jet recording head manufacturing method in this embodiment, the position of the edges of the ink supply hole 109, on the obverse side of the substrate 1, is determined by the position of the outward edges of the grooves 101 formed from the obverse side of the substrate 1. Further, the grooves 101 are formed from the obverse side of the substrate 1, that is, the same side of the substrate 1 as the surface of the substrate 1 on which the heaters 110 are formed. Therefore, the grooves 01 can be accurately positioned relative to the heaters 10 arranged in a predetermined pattern. Therefore, the ink supply hole 109 can be accurately positioned, with ease, relative to the heaters 10. In addition, the obverse surface of the substrate 1 is where the semiconductor circuit is formed. Therefore, it has only a very small number of crystalline defects. Therefore, the grooves 101 in this embodiment formed in this surface are highly accurate in position and dimension. As will be evident from the above description, according to the ink jet recording head manufacturing method in this embodiment, the grooves 101 can be formed so that their inward edges, in other words, the inward edges of the opening of the ink supply hole 109, on the obverse side of the substrate 1, parallel to the rows of heaters 110, will be very accurately positioned relative to the substrate 1. Therefore, the distance L1' (FIGS. 27B and 28) between the edge, on the obverse side of the substrate 1, of the sloped portion of the bottom surface of each ink passage 160, and the center of a given heater 110 becomes very accurate.

Incidentally, also in the case of the manufacturing method in this embodiment, the groove 5 was formed from the reverse side of the substrate 1 by etching, so that the edge of the opening of the groove 5, on the obverse side of the substrate 1, fell within the range of the sacrificial layer 120. Therefore, when the groove 5 was formed, the problems that the above described ridge between a given ink passage 160 and the ink supply hole 109 become misaligned due to crystalline defects of the substrate, deviation in the thickness and orientation flat angle of the substrate 1, deviation in the etching liquid concentration, high temperature process in some of the semiconductor manufacturing steps, etc., was suppressed, that is, compensated for, by the sacrificial layer 120. Therefore, as the groove 5 was formed, all grooves 101 merged with the groove 5 at once.

Further, the protective layer 95 extended to the ridge between the groove 101 and the groove 5. Therefore, the phenomenon that the ridge is disfigured due to an increase in etching rate does not occur. Therefore, the ridge between the ink supply hole 109 and each of the ink passages 160 can be highly accurately formed virtually to match a predetermined specification. Therefore, it is possible to make accurate the distance L2' (between the ridge between the ink supply hole 109 and a given ink passage 160) and the center of a given heater 110 (FIGS. 27B and 28). Further, each ink passage 160 can be highly accurately formed, in particular, the portion of the ink passage 160 on the ink supply hole 109 side, virtually to match the predetermined specification.

As described above, the ink jet recording head manufacturing method in this embodiment makes it possible to highly accurately remove the portions of the substrate 1 which correspond in position to the portion of the ink passages 160 on the ink supply hole 109 side. Therefore, the ink passages 160 are accurately and uniformly formed, being therefore uniform in ink conductance. Further, the end portion of each ink passage 160 on the ink supply hole 109 side is provided with a downwardly sloped bottom surface. With the provision of this structural arrangement, even if the OH distance is reduced, the flow resistance of the ink passage 160 does not increase, because the increase in flow resistance which would have occurred due to the reduction in the OH distance is cancelled by the provision of this structural arrangement. Therefore, ink can be ejected at a higher frequency. In other words, by the ink jet recording head manufacturing method in this embodiment an ink jet recording head capable of recording at a higher speed can be manufactured. In fact, when ink jet recording heads manufactured through trial runs of the manufacturing method in this embodiment were tested, ink could be satisfactorily ejected through all the nozzles at an ejection frequency of 60 kHz; thus, the upper limit of the ejection frequency was higher than 60 kHz. In comparison, when a head which was identical in structure to the head in this embodiment, except that the bottom surface of each of its ink passages, on the ink supply hole side, was not sloped downward, was tested for ejection frequency, it was found to be 45 kHz, proving that the provision of the above described sloped surface could raise the upper limit for the ejection frequency of an ink jet recording head.

Further, in the case of the ink jet recording head manufacturing method in this embodiment, the ridge between the bottom surface of each ink passage 160 and the surface of the ink supply hole 109 could be highly accurately formed, thereby preventing the occurrence of cross-talk. In fact, when an ink jet recording head, which was manufactured through a test run of the manufacturing method in this embodiment and which had a nozzle pitch of 600 dpi (nozzle interval of 42.5 μm), was tested, it was confirmed that cross-talk did not occur.

Also in this embodiment, the downwardly sloped portion of the bottom surface of each ink passage 160, that is, the portion of the bottom surface of each ink passage immediately next to the ridge between the bottom surface of the ink passage and the surface of the ink supply hole 109, is covered with the protective film 95, and the surfaces of the ink supply hole 109 formed by anisotropic etching have a crystal orientation index of <111>. Therefore, the ridge between the bottom surface of the ink passage 160 and the surface of the ink supply hole 109 is highly resistant to the corrosiveness of ink, even if alkaline ink is used. Further, the sloped portion of the bottom surface of each ink passage 160 is covered with the protective film 95, being therefore highly resistant to ink. As will be evident from the above description, this embodiment makes it possible to manufacture an ink jet recording head which is highly resistant to the corrosiveness of ink. If fact, when ink left for a predetermined length of time in ink jet recording heads manufactured through the test runs of the manufacturing method in this embodiment was analyzed, silicon and the like could not be detected at a significant level; silicon and the like had not dissolved into the ink by a significant amount.

Further, in the case of the ink jet recording head in this embodiment, the internal surface of each of the grooves 101 formed from the obverse side of the substrate 1 is entirely covered with the protective film 95 after the formation of the grooves 101. Therefore, even if the grooves 101 are formed by isotropic wet etching, or anisotropic or isotropic dry etching, the grooves 101 are highly resistant to the corrosiveness of ink. Further, the protective film 95 can be given the function of protecting the semiconductor circuit and the like formed on the obverse surface of the substrate 1.

Further, in this embodiment, the protective film 95 is formed on the obverse side of the substrate 1 before the groove 5 is formed by etching the substrate 1 from the reverse side of the substrate 1. Therefore, when the groove 5 is formed, the etching liquid does not come into contact with the obverse surface of the substrate 1, on which the semiconductor circuit is present; in other words, the anisotropic etching for forming the groove 5 can be carried out without adversely affecting the semiconductor circuit and the like. Further, the above described ink jet recording head manufacturing method in this embodiment is much smaller in the amount of debris generated during the formation of the ink supply hole, compared to the ink jet head manufacturing methods in which the ink supply hole is formed by sand blasting, laser processing, or the like. In fact, in the durability tests to which the ink jet recording heads manufactured through the trial runs of the ink jet recording head manufacturing method in this embodiment were subjected, ink was reliably ejected, that is, the problem that the ink jet recording head is plugged up by debris, or the like problems, did not occur, even though the ink was ejected $10^9$ times.

As described above, this embodiment allowed the manufacture of an ink jet recording head which was highly resistant to the corrosiveness of ink, and whose nozzles were uniform in ink refill properties. In other words, this embodiment allowed the manufacture of an ink jet recording head in which ink was reliably supplied to all the nozzles in a predetermined precise amount.

Incidentally, also in this embodiment, a piece of silicon wafer the crystal orientation index of the surface of which is <110> may be used as the substrate 1, in place of the piece of silicon wafer the crystal orientation index of the surface of which is <100>. Further, the method for forming the groove 5 from the reverse side of the substrate 1 may be one of the wet etching methods which are not anisotropic. As the reverse surface etching mask layer 99, a SiOx film may be formed instead of the SiNx film. As for the sacrificial layer 120, a film other than the polycrystalline silicon film may be formed. For example, the sacrificial layer 120 may be formed of aluminum. As for the protective film 95, a SiOx film, a SiNx film, a two-layer film comprising a SiOx film and a SiNx film, a polyether-amide film, etc., may be used.

While the invention has been described with reference to the structures disclosed herein, it is not confined to the details set forth, and this application is intended to cover such modifications or changes as may come within the purposes of the improvements or the scope of the following claims.

What is claimed is:

1. A method for manufacturing an ink jet recording head, wherein the ink jet recording head includes a supply port for receiving liquid from outside, ejection outlets for ejecting the liquid, liquid flow paths, in fluid communication with the ejection outlets, for directing the liquid supplied from the supply port to the ejection outlets, ejection pressure generating portions for generating pressure for ejecting the liquid, the generating portions being disposed at a part of the liquid flow paths, and wherein the supply port is formed as a through-opening in a substrate of Si on which ejection pressure generation elements arranged in a plurality of arrays and constituting the ejection pressure generating portion portions are formed, wherein said supply port is disposed between the arrays, said method comprising:

a step of forming a recessed portion by recessing a side of the substrate of Si having the ejection pressure generation elements from a portion where the supply port is formed to a neighborhood of a portion where the ejection pressure generation elements are formed;

a step of coating a surface of the recessed portion at least where the ejection pressure generation elements are formed, with a protection layer having an anti-corrosion property effective against wet etching used for forming the supply port; and a step of forming, by wet etching, the supply port in such a manner that the supply port is connected to the recessed portion where the protection layer is formed.

2. A method according to claim 1, wherein the recessed portion is formed by dry etching, wet etching, laser machining or machining.

3. A method according to claim 2, wherein the recessed portion is formed by chemical dry etching, reactive ion etching, crystal anisotropic etching, drill machining or end mill machining.

4. A method according to claim 1, further comprising:

a step of forming a mask layer for the wet etching for forming the supply port on a surface opposite from the surface of the substrate having the ejection pressure generation elements, wherein the mask layer has a predetermined pattern having an opening such that a groove formed by the wet etching of the surface that is opposite from the surface of the substrate having the ejection pressure generation elements opens within a region where the recessed portion is formed in the surface having the ejection pressure generation elements;

a step of forming, by wet etching, the groove, so as to extend from the opening of the mask layer to the protection layer, the groove becoming the supply port; and a step of removing a portion of the protection layer which is exposed to the inside of the groove.

5. A method according to claim 4, wherein the etching of the surface opposite from the surface of the substrate having the ejection pressure generation elements is isotropic etching with nitric acid or a mixed acid, or crystal anisotropic etching with an alkaline solution.

6. A method according to claim 4, wherein the etching of the surface opposite from the surface of the substrate having the ejection pressure generation elements is crystal anisotropic etching with KOH or TMAH aqueous solution.

7. A method according to claim 1, further comprising a step of forming an orifice plate for constituting the ejection outlets and the liquid flow paths on the surface of the substrate having the ejection pressure generation elements.

8. A method according to claim 7, wherein the orifice plate is made by solvent coating of a photosensitive resin material and patterning of the photosensitive resin material by photolithography.

9. A method according to claim 7, wherein the orifice plate is provided by forming a member of an elutable resin material with a pattern corresponding to a formation pattern of the liquid flow paths, coating the member with a resin material constituting the orifice plate, and then eluting the member.

10. A method for manufacturing an ink jet recording head, wherein the ink jet recording head includes a supply port for receiving liquid from outside, an ejection outlet for ejecting the liquid, a liquid flow path, in fluid communication with the ejection outlet, for directing the liquid supplied from the supply port to the ejection outlet, an ejection pressure generating portion for generating pressure for ejecting the liquid, the generating portion being disposed at a part of the liquid flow path, and wherein the supply port is formed as a through-opening in a substrate of Si on which an ejection pressure generation element constituting the ejection pressure generating portion is formed, said method comprising:

a step of forming a first groove by recessing the substrate of Si;

a step of forming the ejection pressure generation element constituting the ejection pressure generating portion at a position adjacent the first groove of the substrate;

a step of forming a sacrifice layer for formation of the supply port on the ejection pressure generation element at a position opposite from the first groove, the sacrifice layer being dissolvable by wet etching;

a step of forming, on a surface of the first groove, a protective film having an anti-corrosion property effective against wet etching used for formation of the supply port;

a step of forming a passivation film having an anti-corrosion property effective against wet etching used for formation of the supply port;

a step of forming an etching mask layer on a surface opposite from a surface of the substrate having the ejection pressure generation element;

a step of forming a second groove penetrating from the surface of the substrate opposite from the surface having the ejection pressure generation element to the passivation film and the protective film by wet etching of the surface of the substrate opposite from the surface having the ejection pressure generation element; and a step of forming the supply port by removing the protective film exposed in the second groove to connect the second groove to the first groove.

11. A method according to claim 10, wherein the first groove is formed by crystal anisotropic etching.

12. A method according to claim 10, wherein the first groove is formed by isotropic wet etching.

13. A method according to claim 10, wherein the first groove is formed by dry etching.

14. A method according to claim 10, wherein the second groove is formed by wet etching using KOH or TMAH.

* * * * *

UNITED STATES PATENT AND TRADEMARK OFFICE

CERTIFICATE OF CORRECTION

PATENT NO. : 7,063,799 B2
APPLICATION NO. : 10/745608
DATED : June 20, 2006

INVENTOR(S) : Kazuhiro Hayakawa et al.

It is certified that error appears in the above-identified patent and that said Letters Patent is hereby corrected as shown below:

<u>ON THE TITLE PAGE</u>
Item (56), Other Publications, “Ttauber” should read --Tauber--.

<u>COLUMN 22</u>
Line 49, “10.” should read --110.--.

<u>COLUMN 27</u>
Line 32, “10,” should read --110,--.

<u>COLUMN 30</u>
Line 14, “01” should read --101--.
Line 15, “10” should read --110--.
Line 18, “10.” should read --110.--.

Signed and Sealed this

Fourth Day of March, 2008

JON W. DUDAS
*Director of the United States Patent and Trademark Office*